(12) United States Patent
Giles

(10) Patent No.: US 8,109,448 B2
(45) Date of Patent: Feb. 7, 2012

(54) SYSTEM AND METHOD FOR AT-NOZZLE INJECTION OF AGROCHEMICALS

(75) Inventor: Durham K. Giles, Davis, CA (US)

(73) Assignee: The Regents of The University of California, Oakland, CA (US)

( * ) Notice: Subject to any disclaimer, the term of this patent is extended or adjusted under 35 U.S.C. 154(b) by 505 days.

(21) Appl. No.: 12/273,079

(22) Filed: Nov. 18, 2008

(65) Prior Publication Data
US 2009/0134237 A1    May 28, 2009

Related U.S. Application Data

(60) Provisional application No. 60/989,944, filed on Nov. 25, 2007.

(51) Int. Cl.
*B05B 7/06* (2006.01)
(52) U.S. Cl. ........ 239/428; 429/407; 429/413; 429/433; 429/434
(58) Field of Classification Search .................. 239/400, 239/407, 413, 416.1, 419.5, 422, 428, 428.5, 239/429, 433, 434.5, 434
See application file for complete search history.

(56) References Cited

U.S. PATENT DOCUMENTS

| | | | |
|---|---|---|---|
| 4,330,086 A | | 5/1982 | Nysted |
| 4,714,196 A | * | 12/1987 | McEachern et al. ............ 239/62 |
| 4,802,630 A | * | 2/1989 | Kromrey et al. .............. 239/428 |
| 5,113,945 A | * | 5/1992 | Cable .............................. 169/15 |
| 5,615,836 A | | 4/1997 | Graef |
| 6,338,444 B1 | | 1/2002 | Swan |
| 6,712,293 B2 | | 3/2004 | Swan |
| 7,081,611 B2 | * | 7/2006 | Scott .............................. 250/221 |
| 2006/0063676 A1 | | 3/2006 | Brigance et al. |

FOREIGN PATENT DOCUMENTS
WO    2006002300 A1    1/2006

OTHER PUBLICATIONS

Derksen, R.C. et al.—"Field Evaluation of Application Variables and Plant Density for Bell Pepper Pest Management"—Transactions of the ASABE, vol. 506, No. 6, 2007, pp. 1945-1953.

Derksen, R.C. et al.—"Coverage and Drift Produced by Air Induction and Conventional Hydraulic Nozzles Used for Orchard Applications"—Transactions of the ASABE, vol. 50, No. 5, 2007, pp. 1493-1503.

Guler, H. et al.—"Spray Characteristics and Drift Reduction Potential with Air Induction and Conventional Flat-Fan Nozzles"—Transactions of the ASABE, vol. 5, No. 3, 2007, pp. 745-754.

(Continued)

*Primary Examiner* — Dinh Nguyen
(74) *Attorney, Agent, or Firm* — John P. O'Banion

(57) ABSTRACT

A system and method for combining an additive with a carrier fluid in a spray nozzle. The carrier fluid is fed to one or more nozzles that include an embedded Venturi. The Venturi includes an induction port connected to an additive supply. As the carrier fluid flows through the nozzle, the flow creates a vacuum or suction force that draws in the additive. Of particular advantage, the concentration of the additive combined with the carrier fluid can be maintained constant even if the flow rate of the carrier fluid varies. The system and process are particularly well suited for spraying fields, such as crop fields or orchards, with an agrochemical.

10 Claims, 19 Drawing Sheets

OTHER PUBLICATIONS

Steward, B.L. et al.—"Modeling the Raven SCS-700 Chemical Injection System with Carrier Control with Sprayer Simulation"—Transactions of the ASABE, vol. 42, No. 2, 2000, pp. 231-245.

Stainier, C. et al.—"Droplet size spectra and drift effect of two phenmediphan formulations and four adjuvants mixtures"—Crop Protection, vol. 25, 2006, pp. 1238-1243.

Sikkema, P.H. et al.—"Flat fan and air induction nozzles affect soybean herbicide efficacy"—Weed Biology and Management, vol. 8, 2008, pp. 31-38.

Qiu, W. et al.—"A Feasibility Study of Direct Injection for Variable-Rate Herbicide Application"—Transactions of the ASAE, vol. 41, No. 2, 1998, pp. 291-299.

Paice, M.E.R. et al.—"Control requirements for spatially selective herbicide sprayers"—Computers and Electronics in Agriculture, vol. 14, 1996, pp. 163-177.

Miller, P.C.H. et al.—"Effects of formulation on spray nozzle performance for applications from ground-based boom sprayers"—Crop Protection, vol. 19, 2000, pp. 609-615.

McArtney, S.J. et al.—"Comparative Performance of Air-induction and Conventional Nozzles on an Axial Fan Sprayer in Medium Density Apple Orchards"—HortTechnology, vol. 18, issue 3, Jul.-Sep. 2008, pp. 365-371.

Johnson, A.K. et al.—"Glyphosate Spray Drift Management with Drift-Reducing Nozzles and Adjuvants"—Weed Technology, vol. 20, No. 4, 2006, pp. 893-897.

Paice, M.E.R. et al.—"A stocastic simulation model for evaluating the concept of patch spraying"—Weed Research, vol. 38, 1998, pp. 373-388.

Gillis, K.P. et al.—"Injection Mixing System for Boomless Target-Activated Herbicide Spraying"—Transactions of the ASAE, vol. 46, No. 4, 2003, pp. 997-1008.

Feng, P.C.C. et al.—"Droplet size affects glyphosate retention, absorbtion, and translocation in corn"—Weed Science, vol. 51, No. 3, 2003, pp. 443-448.

Downey, D. et al.—"Direct Nozzle Injection of Pesticide Concentrate into Continuous Flow for Intermittent Spray Applications"—Transactions of the ASABE, vol. 49, No. 4, 2006, pp. 865-873.

Crowe, T.G. et al.—"An Electronic Sensor to Characterize Transient Response of Nozzle Injection for Pesticide Spraying"—Transactions of the ASAE, col. 48, No. 1, 2005, pp. 73-82.

Costa, A.G.F. et al.—"Effect of intensity of wind, pressure and nozzles on spray drift of herbicide applications in pre-emergence"—Weed, vol. 25, No. 1, 2007, 22 pages (includes translation).

Butler Ellis, M.C. et al.—"The effect of different spray liquids on the foliar retention of agricultural sprays by wheat plants in a canopy"—Pest Management Science, vol. 60, 2004, pp. 786-794.

Butler Ellis, M.C. et al.—"Design Factors affecting Spray Characteristics and Drift Performance of Air Induction Nozzles"—Biosystems Engineering, vol. 82, No. 3, 2002, pp. 289-296.

Balsari, P. et al.—"A test bench for the classification of boom sprayers according to drift risk"—Crop Protection, vol. 26, 2007, pp. 1482-1489.

* cited by examiner

SYSTEM AND METHOD FOR AT-NOZZLE INJECTION OF AGROCHEMICALS

CROSS-REFERENCE TO RELATED APPLICATIONS

This application is based on and claims priority from U.S. provisional application Ser. No. 60/989,944 filed on Nov. 25, 2007, incorporated herein by reference in its entirety.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Field of the Invention

This invention pertains generally to liquid sprayer systems and more particularly to the on-demand metering, mixing, atomization and dispersal of a number of liquid components in a single spray liquid mixture.

2. Description of Related Art

Modern agriculture is becoming increasingly dependent on the efficient and accurate application of liquid fertilizers and crop protection agents in order to be profitable and environmentally responsible. Agricultural chemicals may be applied as sprays of liquid solutions, emulsions or suspensions from a variety of delivery systems. Typical systems pressurize liquid from a reservoir and atomize a liquid stream into droplets through a nozzle. Nozzles may be selected to provide a range of droplet sizes, spray distribution patterns and flow rates for a desired liquid material application. Spray distribution, droplet size, droplet velocity and flow rate are important considerations in field applications. Ideally, sprays of properly sized droplets will produce uniform coverage of material over the vegetation, the ground or other substrate. Spray distribution is the uniformity of coverage and the pattern and size of the spray area, including the overlap of spray patterns between nozzles. Poor spray distribution can limit the efficacy of an application and may lead to adverse environmental injuries, poor crop yields and increased costs.

In agricultural spraying, the applied liquid often contains a number of constituents that are mixed prior to application. Once mixed in a central reservoir, the concentration and relative ratios of the individual components in the carrier liquid cannot be altered and the mix may have a limited tank life. Additionally, some constituents, either active ingredients, inert materials in the pesticide formulations or adjuvants selected by the applicator, may be chemically or physically incompatible and not mix properly.

Chemical injection systems, where carrier fluids, active ingredients and adjuvants are mixed during application, rather than prior to application, have been developed and marketed for agricultural spraying. In these systems, a central pump propels the carrier fluid, consisting of the primary diluent, often water, and perhaps a mixture of compatible materials to the nozzles for distribution. The incompatible fluid components are propelled by separate pumps, from separate reservoirs, and injected into the carrier fluid flow either upstream of the carrier pump or downstream of the carrier pump.

Additionally, it is sometimes desirable to apply some of the spray liquid components only to certain portions of a crop field to be treated. In those situations, the entire mix of spray liquid components is not prepared prior to initiating the spray application job. Rather, the components that are to be applied to certain portions of the field are applied using a separate spray system containing only the component to be applied singularly.

The limitations of common injection systems have been investigated and documented by researchers in the technical field of agricultural spraying. Steward and Humburg (2000), investigating injection system for maintaining a constant deposition rate of spraying as ground speed of a spraying vehicle varied, found that direct injection systems can reduce much of the application rate error that results from variations in the ground speed. They also found that chemical injection with carrier flow rate control resulted in less application error than when the carrier flow rate was held constant and the injected chemical rate varied, as it minimized concentration variations and reduced transport delays.

One disadvantage of some direct injection systems is that the lag time from initiation of an injection chemical rate change to the time when the new rate of chemical actually leaves the nozzles can lead to chemical application rate errors during transient response times.

A commercial injection system has also been proposed for maintaining a constant concentration circulating in a chamber awaiting sensor-triggered spot spraying of weeds. The system maintained a desired concentration over a range of operating conditions.

The fundamental limitation with many commercial injection systems, however, can be due to the basic configuration where the central injection point is located immediately upstream or downstream from the carrier liquid pump. This results in lengthy hose and pipe distances from the injection point to the nozzles. Moreover, the length of fluid passage from the injection point to each nozzle is variable. The consequence of this configuration is that the time delays between changes in injection rate and the arrival of the altered rate at the nozzles are lengthy and vary from nozzle to nozzle. Therefore, application rates of the injected materials are non-uniform across the boom and temporally and spatially variable in an unintended and undesirable manner.

A solution to the problems resulting from a central injection point is to inject materials directly at the nozzle inlet. However, this configuration is not without considerable challenges; pumping and metering of the injected fluid must be distributed along the spray booms and adequate mixing must occur within the nozzle during a brief time period. Crowe et al. (2005) reported the development of an "at-nozzle" conductivity probe for high-speed measurement of transient injection events. Further work by Downey et al. (2006) investigated the use of miniature metering valves at individual spray nozzles. The system provided rapid response for triggered spraying; however, the components were expensive, complex and required a pressurized source of injection liquid near the spray nozzle.

Previous systems addressing injection at the nozzle inlet have required pumping and metering systems and modification of nozzle plumbing. An additional question has related to the degree of mixing within the nozzle before discharge. Pressurized lines of highly concentrated pesticide are often considered a potential hazard.

One type of nozzle that has been used in prior spraying systems is the air induction nozzle. Air induction nozzles are constructed with an embedded Venturi induction port fabricated into the nozzle assembly. The Venturi port creates a vacuum that induces the flow of ambient air into the nozzle, resulting in enlarged droplet size spectra in an attempt to mitigate spray drift, that is, the unintended and undesirable movement of spray droplets away from their intended target. Ambient wind, coupled with small sized droplets, is the prime cause of spray drift.

Air induction nozzles have been used commercially as a simple means of drift reduction in agricultural field spraying. For typical nozzles tested, the degree of air entrainment ranged from 0.2 to 0.61 $min^{-1}$. Air induction nozzles have shown some ability to control droplet size produced by the nozzles. Droplet size can be affected by the degree of air entrainment and/or by the orifice size of the nozzle. However, sprayer systems using air induction nozzles have the same problems described heretofore as systems using other types of nozzles.

Accordingly, there is a need for a sprayer system in which injection of an agrochemical into a carrier fluid or carrier mixture of fluids can be achieved easily, reliably and without complex components. Moreover, there is a need for a system that reduces time delays between injection and dispersal of the spray mixture and/or one that provides greater uniformity in distribution of chemical mixtures throughout lengthy spray nozzle arrays.

SUMMARY OF THE INVENTION

The present invention provides a system and method for metering and injecting an additive, such as a stream of liquid, into a carrier fluid as the carrier fluid is supplied to a spray nozzle or dispensing device. The system and method use a nozzle with at least one embedded Venturi as a foundation for at-nozzle injection, which offers control over injection amount and mixing prior to discharge. The system can, but not necessarily exclusively, use "air induction" nozzles as the injection device. The system can provide a simplicity and robustness not found in existing and previous spray liquid injection systems.

One aspect of the invention is a system for dispensing controlled amounts of an additive mixed with a carrier, including one or more dispensing and mixing nozzles, each nozzle including a Venturi and an induction port in communication with the Venturi; a carrier fluid supply connected to each nozzle; and an additive fluid supply connected to the induction port of each nozzle; wherein carrier fluid flow through the Venturi in the nozzle causes additive fluid to be drawn into the nozzle and mixed with the carrier fluid prior to exiting the nozzle.

Another aspect of the invention is a method for dispensing controlled amounts of an additive mixed with a carrier, by providing a dispensing and mixing nozzle having an embedded Venturi therein and an induction port in communication with the Venturi; connecting an additive fluid supply to the induction port of the nozzle; flowing a carrier fluid through the Venturi in the nozzle, thereby causing a pressure drop or vacuum that draws additive fluid into the Venturi and mixes the additive fluid with the carrier fluid; and dispensing the mixed carrier fluid and additive fluid from the nozzle.

A further aspect of the invention is an improvement in a spraying system having a nozzle with an internal Venturi and an air inlet to the Venturi, and a carrier fluid supply connected to the nozzle, the improvement being an additive fluid supply connected to the air inlet for mixing an additive fluid drawn into the nozzle by the Venturi effect with a carrier fluid flowing through the nozzle.

According to the present invention, nozzles containing a Venturi are used to combine controlled amounts of an additive, such as an agrochemical, with a carrier fluid prior to discharge. The present inventor discovered that the nozzles can be used as simple robust injection components, with the pumping and metering functions achieved by the Venturi passages. In such a use, injection can be achieved at each nozzle simultaneously and through the use of low pressure, inherently safe liquid supply plumbing.

It was further discovered that the Venturi-based, air induction nozzles can provide a self regulating system where the concentration of injected fluid in the spray stream emitted from the nozzle can be maintained at a constant level even as the carrier fluid flow rate varied.

The system is useful for the application of fluid mixtures where one or more components of the mixture may be physically incompatible when prepared as a mixture in a storage tank.

In one embodiment, a fluid connection is made into the existing air inlet port of an air induction nozzle. The liquid to be injected is supplied to the inlet port through the vacuum created by the Venturi; once entered into the Venturi, the injected fluid mixes with the carrier fluid and is dispensed as a fluid mixture.

In another embodiment, a metering orifice is introduced between the fluid connection into the spray nozzle Venturi inlet and the injected fluid supply reservoir. The metering orifice determines the relative flow rate between the carrier fluid and the injected fluid and thereby controls the concentration of injected fluid in the dispensed spray liquid from the nozzle.

In another embodiment, an electronic throttling valve is used to alter the effective metering orifice between the nozzle Venturi inlet and the injected fluid reservoir. In this manner, the ratio of flow rate of carrier fluid through the nozzles and flow rate of injected fluid into the nozzle is controlled, thereby controlling the concentration of the injected fluid in the spray fluid dispensed from the spray nozzle.

In view of the above, one embodiment of a system for dispensing controlled amounts of an additive, such as an agrochemical, comprises one or more nozzles or other dispensing devices, each having an internal integrated Venturi therein. The system includes a first reservoir for holding a carrier fluid. The first reservoir is in fluid communication with a first distribution manifold. The first distribution manifold is also in fluid communication with the one or more dispensing nozzles so that carrier fluid from the first reservoir passes through the one or more nozzles, passing through the Venturis therein. The system further includes a second reservoir for holding an additive, which may be a liquid, gas, dispersion, suspension or the like. A second distribution manifold is in fluid communication with the second reservoir and with the plurality of dispensing nozzles.

In accordance with the present invention, each dispensing nozzle includes at least one Venturi. Each Venturi includes at least one induction port that is in communication with the second distribution manifold. In this manner, as the carrier fluid flows through the Venturi, a vacuum is created that draws in the additive for combining with the carrier fluid to form a fluid mixture prior to exiting the nozzle.

In one embodiment, both the carrier fluid and the additive are liquids. The system is particularly well suited to combining an additive, or more particularly an agrochemical, with a carrier fluid where the two components have incompatibility issues. For instance, the two components may be immiscible or may have a limited functional life once combined together.

In one embodiment, suspended solids may also be contained in one or both of the components. For instance, the carrier liquid and/or the agrochemical may also be a dispersion or suspension.

In general, the carrier fluid can be any appropriate carrier for the agrochemical and may be a liquid or a gas. For instance, in one embodiment, the carrier fluid may be water, either alone or in combination with other ingredients. The additive, on the other hand, may be any fluid that provides some type of benefit within the process. The additive, for instance, may be any chemical agent that has an affect on the substrate being sprayed or may be any fluid that facilitates application of the carrier fluid or that enhances one or more ingredients contained in the carrier fluid. As used herein, however, the additive excludes air. As described above, in one embodiment, the additive is an agrochemical. The agrochemical may be any chemical that either provides a benefit to a crop being grown or otherwise facilitates application of the carrier fluid. Examples of agrochemicals that may be dispensed using to the present invention include a herbicide, an insecticide, a pesticide, a growth regulator, a desiccant, a defoliant, a fungicide, a rodentacide, a fertilizer, a nutrient stabilizer, a soil conditioner, a root stimulant, a surfactant, a drift inhibitor, a buffer, or mixtures thereof.

In general, the agrochemical is combined with the carrier fluid such that the resulting mixture contains the agrochemical in the amount from about 0.5 percent to about 40 percent by weight, such as from about 0.5 percent to about 10 percent by weight. The actual amount of the agrochemical combined with the carrier fluid may depend upon numerous factors.

As described above, the second distribution manifold feeds the agrochemical to the Venturis contained in the dispensing nozzles through an induction port. Each dispensing nozzle can include a single induction port that is placed in communication with the second distribution manifold or can contain a plurality of induction ports that are in communication with the second distribution manifold. In addition to induction ports for the agrochemical, the dispensing nozzles can further include gas ports for combining a functionally inert gas, such as air, or a functional gas such as a pesticide or growth regulator or other agrochemical with the fluid mixture. In one embodiment, one or more gas ports may be in communication with the Venturis on the dispensing nozzle for drawing in air to the nozzles. In an alternative embodiment, each dispensing nozzle may include a second Venturi. The second Venturi may include one or more air ports for combining air with the carrier fluid or with the fluid mixture. The second Venturi, for instance, may be positioned before or after the Venturi that is used to mix the agrochemical with the carrier fluid.

In still another embodiment of the present invention, each dispensing nozzle can include a plurality of Venturis, where each Venturi is used to inject a separate additive into the carrier fluid. For example, two to five Venturis may be placed in series in order to inject two to five additives into the carrier fluid without any premixing of the additives. This enables easy changes of the relative proportions of the different additives as spraying is performed.

The system of the present invention can further include various controls for monitoring and adjusting the flow rate of the carrier fluid and/or agrochemical. For example, the first distribution manifold may be in communication with a pumping device and a flow control device for feeding controlled amounts of the carrier fluid to the dispensing nozzles. The flow rate of the agrochemical, in one embodiment, can be at least partially controlled by controlling and adjusting the flow rate of the carrier fluid through the dispensing nozzles. Orifice devices may also be placed upstream of the dispensing nozzles on the second distribution manifold for also controlling the flow rate of the agrochemical.

In one embodiment, the first distribution manifold may be placed in communication with a first flow meter and a first pressure transducer, while the second manifold may be placed in communication with a second flow meter and a second pressure transducer. The system can further include a controller that is placed in communication with the above devices. The controller, based upon receiving information from the first flow meter, the first pressure transducer, the second flow meter, and the second pressure transducer may be configured to adjust the flow rates of the carrier fluid, the agrochemical, or both.

In one embodiment, the controller can be placed in communication with a global positioning location and rate map device that may be used to convey information to the controller that may be used in adjusting the flow rates of the carrier fluid, the agrochemical, or both. Similarly, the system may also include a crop sensor placed in communication with the controller. The controller, based upon information received from the crop sensor, can then adjust the flow rates of the various components. In these embodiments, the flow rates of the components can be controlled depending upon various conditions in the field and the desired result.

In addition to a system, the present invention is also directed to a method for dispensing controlled amounts of an additive, such as an agrochemical. The method includes the step of flowing a carrier fluid through a plurality of dispensing nozzles. Each dispensing nozzle includes a Venturi and an induction port in communication with the Venturi. An agrochemical is fed through the induction ports of the Venturi for mixing with the carrier fluid to form a fluid mixture. The carrier fluid creates a vacuum within each Venturi which draws in the agrochemical into the dispensing nozzle. In accordance with the present invention, the fluid mixture is then dispensed onto a field. The field, for instance, may be a crop field, an orchard, or the like.

In still another embodiment, the ratio of injected fluid to the carrier fluid is actively controlled by an electronic throttling valve in response to electronic control signals from Global Positioning Systems and spray application rate controllers or crop sensors on a mobile spray application vehicle. In this manner, the application rate of an agrochemical can be varied in accordance with the need for the chemical at a particular location at a particular time.

Further aspects of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only.

DETAILED DESCRIPTION OF THE INVENTION

In general, the present invention is directed to a system and method for combining controlled amounts of an additive, such as an agrochemical, with a carrier fluid in a fluid dispensing process. More particularly, the present invention is directed to using one or more nozzles containing a Venturi through which the carrier fluid flows. Each Venturi includes an induction port for feeding controlled amounts of the additive into the nozzle. As the carrier fluid flows through the Venturi, a vacuum is created that draws in the additive for combining with the carrier fluid. The Venturi and supporting structure also create turbulent conditions within the nozzle for ensuring that the additive and the carrier fluid are well mixed prior to exiting the nozzle.

The present invention is particularly well suited for use in agricultural spraying systems and for combining an agrochemical with a carrier fluid, such as water. Through the use of a Venturi, the additive is combined with the carrier fluid in an at least a semi-automatic manner. For example, increasing or decreasing the flow of the carrier fluid can increase or decrease the flow of the additive while maintaining the concentration of the additive in the resulting fluid mixture substantially constant. As will be described in greater detail below, further controls can be placed into the system for ensuring that the desired ratio of components exits the nozzle.

Of particular advantage, the additive and the carrier fluid are combined within the nozzle just prior to being dispensed from the system. Thus, incompatible materials can be combined and dispensed in a relatively simple manner. Having the carrier fluid and additive being combined in the nozzle, also allows for rapid adjustments in the concentration of the additive and the resulting mixture as environmental conditions change during the application process.

Figure 1:
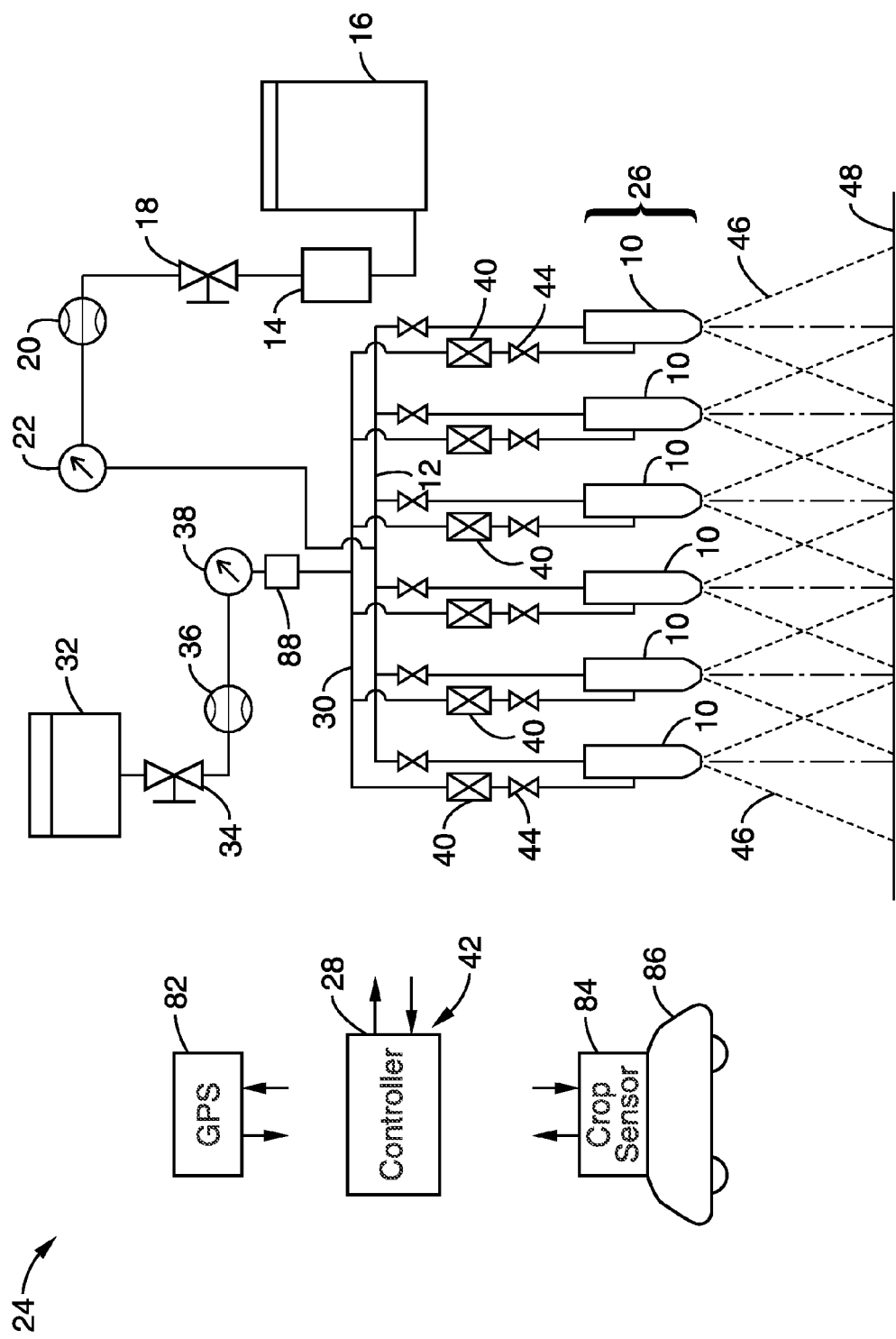
FIG. 1 is a schematic diagram of an embodiment of the invention including a plurality of spray nozzles and liquid injection lines and control and monitoring components for carrier and injection fluid supply systems.
Figure 2:
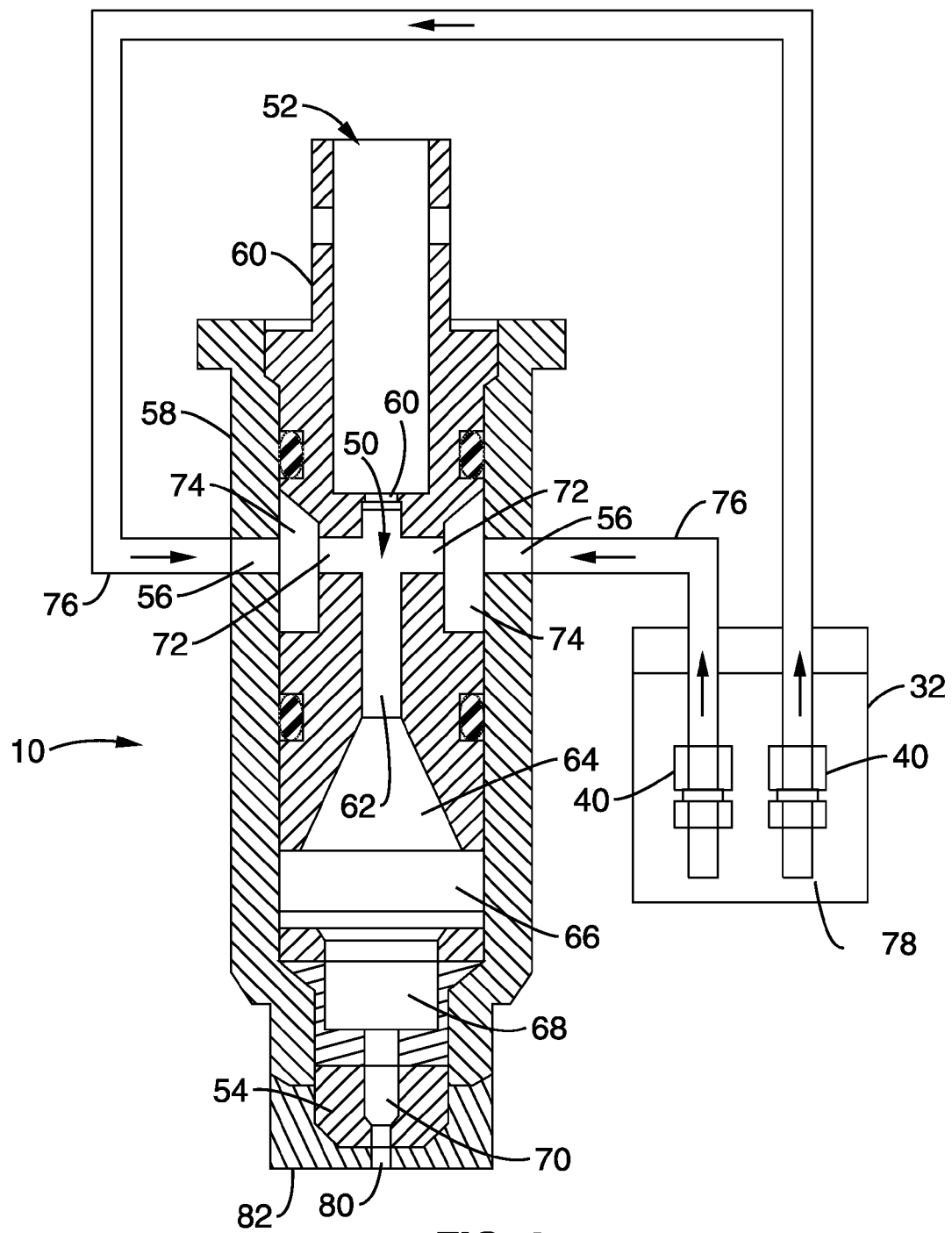
FIG. 2 is a schematic diagram of an air induction nozzle with Venturi ports for receiving injected liquid from a supply reservoir.
Figure 3:
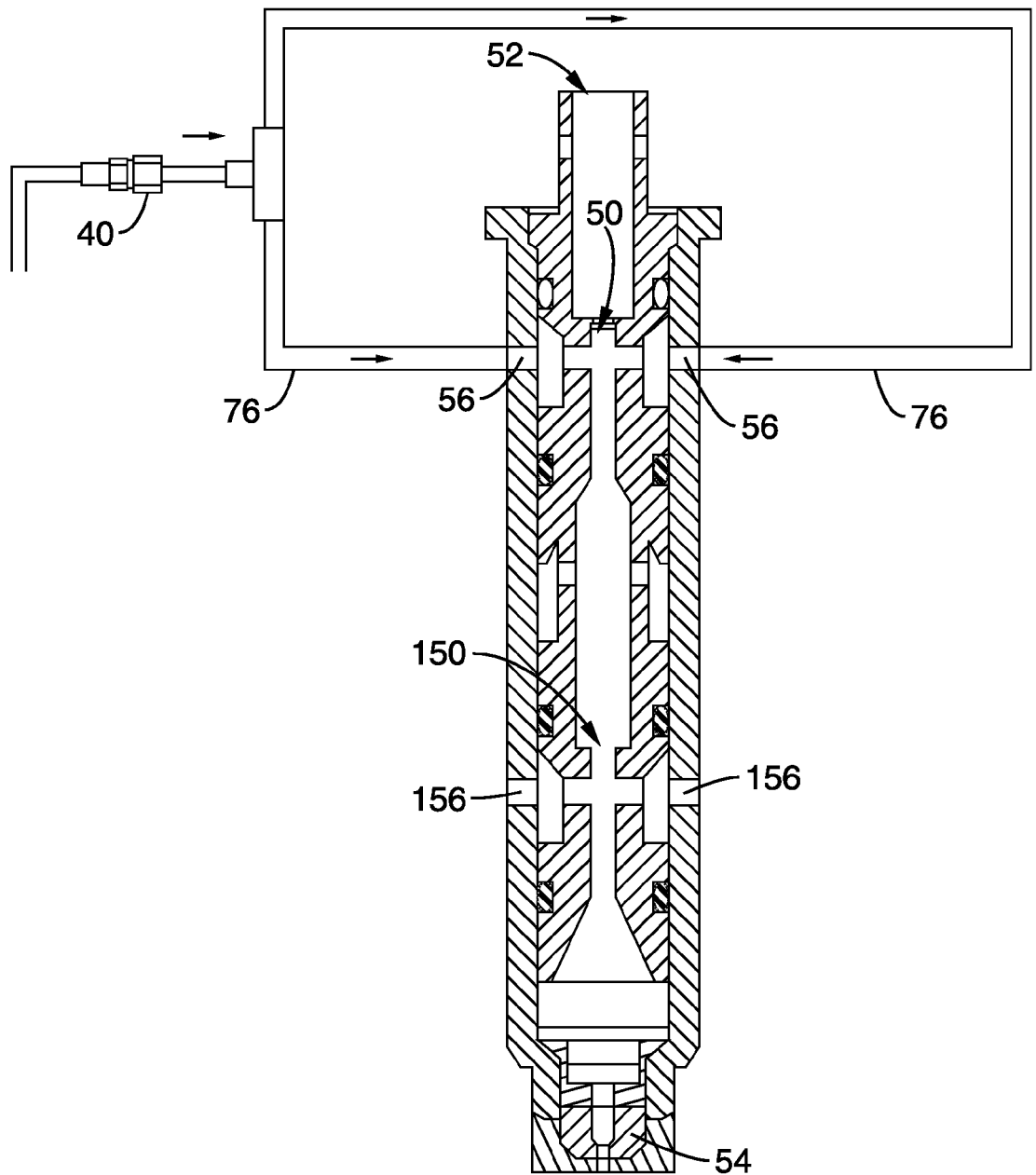
FIG. 3 is a schematic diagram of a nozzle in which a series of Venturi ports are used for inlet of injected fluid and ambient air.

Referring more specifically to the drawings, for illustrative purposes the present invention is embodied in the apparatus and system generally shown in FIG. 1 through FIG. 3. It will be appreciated that the apparatus may vary as to configuration and as to details of the parts, and that the methods may vary as to the specific steps and sequence, without departing from the basic concepts as disclosed herein.

FIG. 1 generally shows a schematic diagram of one embodiment of a system according to the present invention. FIG. 2 shows details of a portion of the system, including a nozzle with embedded Venturi. FIG. 3 shows a more complex multistage nozzle with a pair of Venturis.

In FIG. 1, a system 24 is shown that has a plurality of induction nozzles 10 that are arranged in a parallel manner (or other desired orientation) in an array 26. While six nozzles are shown, in practice the number can vary from a single nozzle up to a large number of nozzles. Each nozzle 10 is supplied at one end thereof with carrier fluid via a manifold 12 that is pressurized by a pumping device 14 withdrawing fluid from a carrier fluid reservoir 16. The carrier fluid supply circuit may include a metering and control (throttle) valve 18 that may be manually or remotely adjusted to achieve a desired flow rate or pressure of the carrier fluid. The carrier fluid supply circuit may also include a flow meter 20 and a pressure transducer 22 that can provide control information to a controller 28 that can be hard wired or part of a remote control system. The connection of controller 28 to the rest of system 24 is represented by the arrows 42. The controller 28, for instance, may be any suitable programmable logic unit, such as a microprocessor or a computer.

Each nozzle 10 is also supplied with a fluid or additive to be injected into the carrier fluid stream. The injected fluid or additive is supplied to the nozzles from a manifold 30 to which the additive is supplied from a reservoir 32. The additive supply circuit may include a metering and control (throttle) valve 34 that may be manually or remotely adjusted to achieve a desired flow rate or pressure of the injected fluid. The additive supply circuit may also include a flow meter 36 and a pressure transducer 38 that provide control information to the controller 28. The motive force for the propulsion of the additive is mainly supplied by Venturi passages within the induction nozzles 10 but may be supplemented by a pumping device. In FIG. 1, the motive force for the injection is supplied by the Venturi passages within the induction nozzles 10 but an optional pump 88 may be added to the additive fluid supply circuit to increase fluid flow.

The additive supply lines to the nozzles 10 may contain metering orifices 40 to provide a controlled resistance to fluid flow. Additionally, the supply lines may contain a one-way flow or "check" valve 44 that allows fluid flow toward the nozzle 10 but not in the reverse, i.e., from the nozzle 10 back to the manifold 30 direction. This prevents unintended or undesirable changes in manifold pressure should a nozzle 10 malfunction.

In operation, a carrier fluid, which may comprise a mixture of different components, is placed into the carrier reservoir 16 and propelled by the pumping device 14 to nozzles 10. The flow rate of the carrier fluid into nozzles 10 can be controlled by common means such as the adjustment of the pump rotation speed or by modulation of the throttling valve 18. The flow rate of carrier fluid from the nozzles 10 will typically follow the standard square root relationship wherein the volumetric flow rate of carrier fluid as measured by the flow meter 20 will be proportional to the square root of the pressure indicated by the pressure transducer 22. As carrier fluid flows through nozzle 10, it passes through an internal Venturi passage way (shown in FIG. 2). The carrier fluid flow through the Venturi will induce a vacuum on inlet ports to the Venturi to which the additive supply is connected. The vacuum will draw the injection fluid through the manifold 30 and into the nozzle 10.

The flow rate of injected additive into the carrier fluid flow is controlled by the flow rate of the carrier fluid and can also be controlled by the metering orifices 40. This provides a passive, simple means for metering the concentration of injected fluid into the carrier fluid.

Alternatively, the needle or similar throttling valve 34 can be adjusted to control the flow rate of injected fluid into the nozzles 10. The pressure measured by the pressure transducer 38 and the volumetric flow rate measured by flow meter 36 can be transmitted to the controller 28, which in turn can make adjustments as needed.

The mixed carrier/additive fluid exits the distal ends of nozzles 10 in a spray 46 which is applied to a spray application area 48. Spray application area 48 is typically an agricultural field. By selecting the output spray pattern of nozzles 10 and the configuration of array 26, desired coverage of sprays 46 over area 48 can be obtained.

The induction nozzles 10 as shown in FIG. 1 are shown in more detail in FIG. 2. Carrier fluid enters the nozzle 10 at a nozzle inlet 52 at one end thereof and passes through an internal Venturi 50 to a spray tip 54 at the distal end thereof. The carrier fluid passage through the Venturi 50 produces a vacuum at the Venturi induction ports 56. In this embodiment, the Venturi 50 is used to induce an injection additive flow through Venturi ports 56 into the carrier fluid dispensed by the nozzle 10.

The general configuration of nozzle 10 is well known in the art, as exemplified by the air induction liquid spray nozzle assembly of PCT Published International Application WO 2006/002300, incorporated herein by reference in its entirety. Nozzle 10 generally comprises a nozzle body 58 and a nozzle body insert 60 that is removably engaged within body 58. Insert 60 defines therethrough a fluid flow passage that includes the carrier inlet 52, a metering orifice 60, and the Venturi 50, which is part of the downstream expansion section 62. Expansion section 62 ends in outwardly flared conical section 64 that communicates with expansion chamber 66 in body 58. Expansion chamber 66 is next to mixing chamber 68 in spray tip 54 which is also removably engaged within body 58 at the distal end thereof. Mixing chamber 68 communicates with outlet 70 in spray tip 54. An aperture 80 in the end 82 of nozzle body 58 is aligned with channel 70 in tip 54 so that fluid is sprayed out of nozzle 10.

Venturi 50 includes a pair of transverse passage ways or ports 72 that extend perpendicularly from the flow passage through insert 60. Nozzle body 58 includes induction ports 56 formed therethrough. Venturi ports 72 in insert 60 are aligned with induction ports 56 in body 58. An inlet chamber 74 is defined between insert 60 and body 58, and Venturi ports 72 and induction ports 56 communicate with this inlet chamber 74. Additive supply lines 76 are connected to the injection ports 56. The additive fluid supply circuit of FIG. 1 is not repeated in FIG. 2. Instead, supply lines 76 are shown as drawing additive injection fluid 78 from reservoir 32, with metering orifices 40 at the supply line intakes. The invention can be implemented with any suitable supply configuration. In operation, the flow of carrier fluid through Venturi 50 produces a pressure drop or vacuum that is applied through ports 72 to additive fluid 78 in supply lines 76, i.e. the pressure difference causes fluid from reservoir 32 to flow through supply lines 76, ports 56, chamber 74, and ports 72 to the flow channel within nozzle 10 where it mixes with the carrier fluid.

FIG. 2 shows two injection fluid inlet ports 56 into the nozzle Venturi 50. Alternatively, one port may be connected to the injection fluid flow and the other port may comprise a gas port for drawing in air to control droplet size. Alternatively, the nozzle may be fabricated so that there is only one port into the Venturi.

An alternative embodiment of the nozzle 10 is shown in FIG. 3. In this embodiment, a series of two Venturis 50 and 150 are included in the nozzle assembly. The carrier fluid enters the nozzle in the manner as in FIG. 2, at one end of the nozzle at inlet 52. As the carrier fluid passes through the first Venturi 50, the fluid to be injected is drawn into the Venturi. The carrier fluid and the injection fluid mix and the internal pressure recovers as the fluid passes downstream from the Venturi 50. The mix of carrier and injected fluid then passes through a second Venturi 150 where ambient air is induced to effect the desired modification in the droplet size spectrum of the spray to be dispensed. In particular, nozzle 10 includes two gas ports 156 that are used to draw in the ambient air. Alternatively, the Venturi 150 that is used to draw in air may be positioned upstream from the Venturi 50 which is used to draw in the additive, i.e. Venturi 50 and Venturi 150 may be reversed or supply lines 76 may be connected to ports 156 instead of ports 56. It will be understood by those skilled in the art that multiple Venturi passageways in series could be used to introduce a number of injection fluids into a single spray nozzle.

As described above, the system and method of the present invention is particularly well suited for use in the agricultural field. The system and method, however, can also be used in other spray systems. In this regard, the additive that is combined with the carrier fluid can comprise a limitless variety of different chemicals, compounds, species, gases, dispersions, suspensions, and the like.

In one application, the additive combined with the carrier fluid is an agrochemical. The agrochemical, for instance, may be an herbicide, an insecticide, a pesticide, a nematicide, a growth regulator, a desiccant, a defoliant, a fungicide, a rodentacide, a fertilizer, a nutrient stabilizer, a soil conditioner, a root stimulant, a surfactant, a drift inhibitor, a buffer, or mixtures thereof. As described above, in one embodiment, each nozzle may include a plurality of Venturis for combining different additives at each Venturi with the carrier fluid.

The carrier fluid can be any suitable fluid capable of being combined with the one or more additives. The carrier fluid may be a gas, but for most applications, is a liquid. In one embodiment, for instance, the carrier fluid is water. Water, for instance, may be used alone as the carrier fluid or may be premixed with various other ingredients and additives that may be more compatible with the carrier fluid than the additive being injected at the one or more nozzles. When comprising only water, the reservoir for the carrier fluid may be any suitable water source, such as a city water source.

The amount of additive combined with the carrier fluid may depend upon various factors including the type of additive used, the particular application, and the desired result. In general, for instance, the additive can be combined with the carrier fluid in the amount of from about 0.5 percent to about 10 percent by weight. Greater or lesser amounts, however, are possible.

The system of the present invention, such as the embodiment shown in FIG. 1, can be manually operated, semi-automatic, or fully automated. For instance, various different controls can be included in the system so that flow rates can be adjusted manually or can be done automatically. As described above, for instance, a controller 28 can be connected to all of the system components and, based on information received from the components, can control other components in order to adjust flow rates and component ratios. In one embodiment, controls can also be included for varying the flow rate through each of the nozzles 10. In particular, in some embodiments, it may be desirable to alter the flow rate between the individual nozzles. In this regard, the nozzle 10 can include or be in communication with a valve for adjusting individual flow rates. Valves 80 between manifold 12 and each valve 10 for individual control of the flow in each nozzle 10 are representative.

Controller 28 can be placed in communication with a global positioning location and rate map device 82 that may be used to convey information to the controller that may be used in adjusting the flow rates of the carrier fluid, the agrochemical, or both. Similarly, the system may also include a crop sensor 84 placed in communication with the controller 28. The controller 28, based upon information received from the crop sensor 84, can then adjust the flow rates of the various components. The crop sensor 84 may be stationary, i.e. positioned at a particular location, or may be mobile, e.g. mounted on a spray application vehicle 86 (on which the system 10 may also be mounted). In these embodiments, the flow rates of the components can be controlled depending upon various conditions in the field and the desired result.

The invention may be better understood with reference to the accompanying examples, which are intended for purposes of illustration only and should not be construed as in any sense limiting the scope of the present invention as defined in the claims appended hereto.

EXAMPLE 1

The nozzle used in this example was a 110 degree fan angle, Venturi flat fan nozzle (AI 11004, TeeJet, Spraying Systems, Inc.). Inserted into the two air inlet ports of the integrated Venturi were barbed connectors leading to 50 cm of plastic tubing (1.6 mm i.d.). The plastic tubing terminated into a standard threaded nozzle body assembly (CP1322 ¼TT, TeeJet, Spraying Systems, Inc.) into which a range of orifice metering plates were installed. The metering plates were standard commercial components (CP 4916 Series, TeeJet, Spraying Systems, Inc.) with orifice diameters of 0.20, 0.38, 0.76, 1.54 and 3.05 mm (Plate Nos. 8, 15, 30, 61 and 120, respectively, Spraying Systems, Inc.). The carrier liquid, supplied to the liquid inlet of the nozzle, for all experiments was de-ionized water and the injected liquids, supplied to the air induction ports, were de-ionized water, a 0.25% v/v surfactant solution (Triton X-100, Fisher Scientific) in de-ionized water and a 0.25% v/v polymer solution (polyacrylamide, Target LC, Loveland Chemicals, Inc.) in de-ionized water.

Flow rates of injected liquid into the carrier liquid were determined by adding a tracer salt (NaCl) to the injected fluid to create a 10,000 or 15,000 mg $L^{-1}$ concentration. The concentration of the tracer in the discharged spray from the nozzle was measured along with the total flow rate of liquid from the nozzle. Concentration was measured using a calibrated conductivity probe (Model TDS Testr1, LaMotte). With the tracer concentration of the discharged fluid and the injected fluid being known, along with the total flow rate from the nozzle and the zero concentration of tracer in the carrier fluid, conservation of mass of tracer could be used to determine the flow rate of injected fluid.

Mass distribution, viz., the "spray pattern" from the nozzle was determined by collecting spray discharge in 125 ml bottles positioned at 9 cm spacing in an array along the axis of the emitted spray fan. Collected mass was measured using an electronic scale. Similarly, distribution of injected fluid across the spray pattern was measured by preparing a 1000 ppb solution of brilliant sulfaflavine (BSF) that was used as the injection fluids as described earlier. An array of collection bottles was placed at 9 cm spacing along the spray pattern. The collected samples were analyzed using a fluorometer (VersaFluor 100-120-200V, Bio-Rad) that had been calibrated over a range of 1 to 300 ppb of the tracer. Spray distribution and injected liquid uniformity were measured at a nozzle-to-sample plane distance of 50 cm and graphed for visual assessment and analysis.

Spray droplet size spectra were analyzed using a laser diffraction instrument (Malvern Spraytec 2600, 450 mm lens) positioned on the nozzle center line and 50 cm below the nozzle. The system was operated in the model independent mode, time history setting and data were collected at 1 kHz for 60 sec or until the distribution appeared to be stable. Media and particulate refractive indices were 1.00+0.00i and 1.33+0.00i, respectively.

Figure 4:
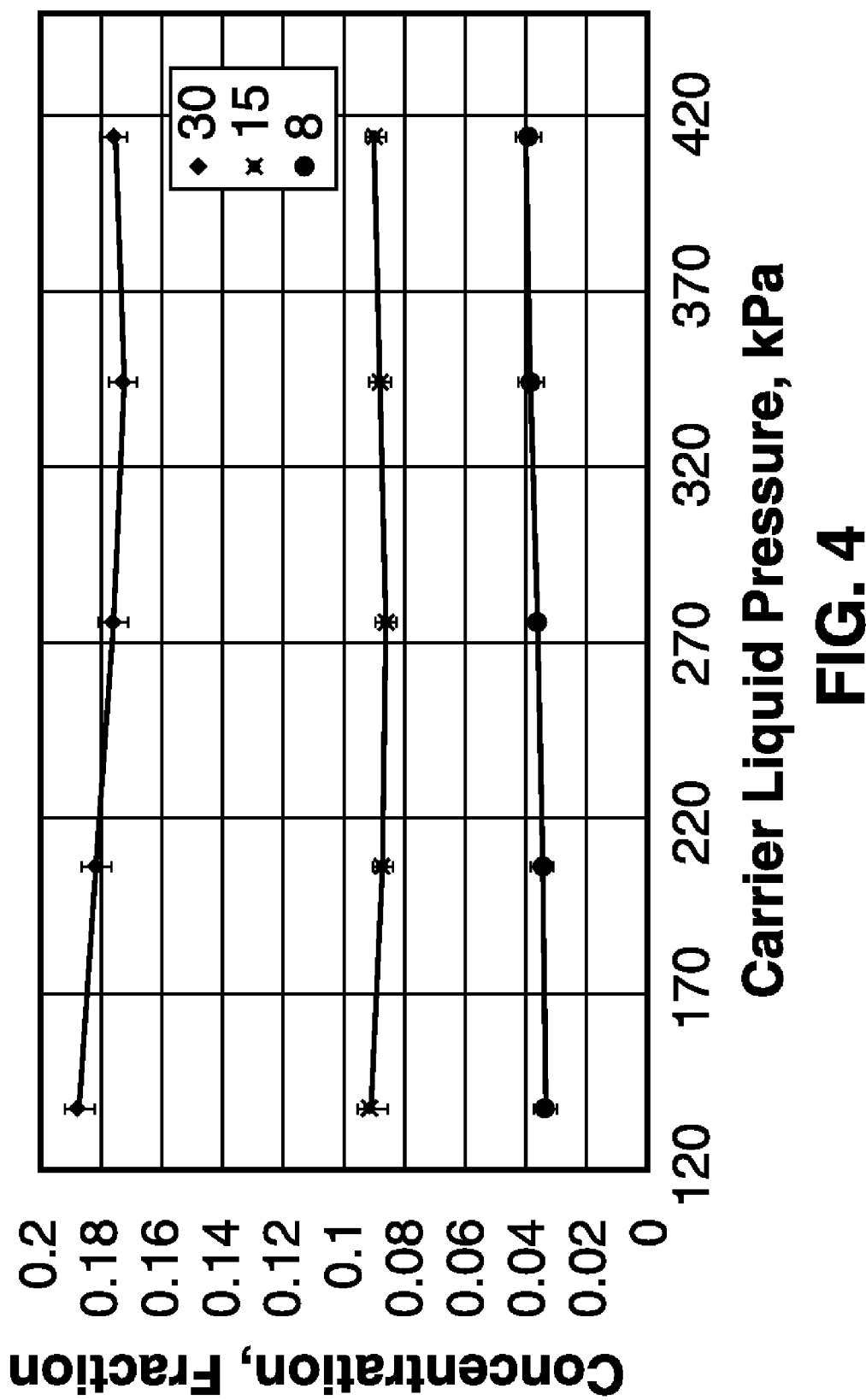
FIG. 4 is a graph of the concentration of injected fluid in the total discharged fluid from the spay nozzle for a series of nozzle carrier fluid supply pressures and injection fluid metering plates of different diameters.

The degree to which the nozzle could induce injection liquid flow into the carrier fluid of the nozzle was determined. When the liquid supply was connected to the nozzle inlet ports, the Venturi vacuum was sufficient to produce a concentration of over 30% v/v of injected liquid in the nozzle discharge, exceeding typical application rates of most concentrated pesticide formulations. The apparatus was then modified to allow the installation of standard, commercial metering orifices into the induction flow lines. A range of metering orifices (Nos. 8, 15 and 30) were used. These orifice plates produced injection rates of approximately 3 to 18% concentration. Observed data are presented in FIG. 4 and indicate that the concentration of injected material tends to remain constant as the supply pressure and corresponding volumetric flow rate of carrier liquid vary over a typical operating range. This indicates that the invention can be used as a passive injection rate controller to maintain a constant concentration as the carrier fluid flow rate through a nozzle is varied.

Figure 5A:
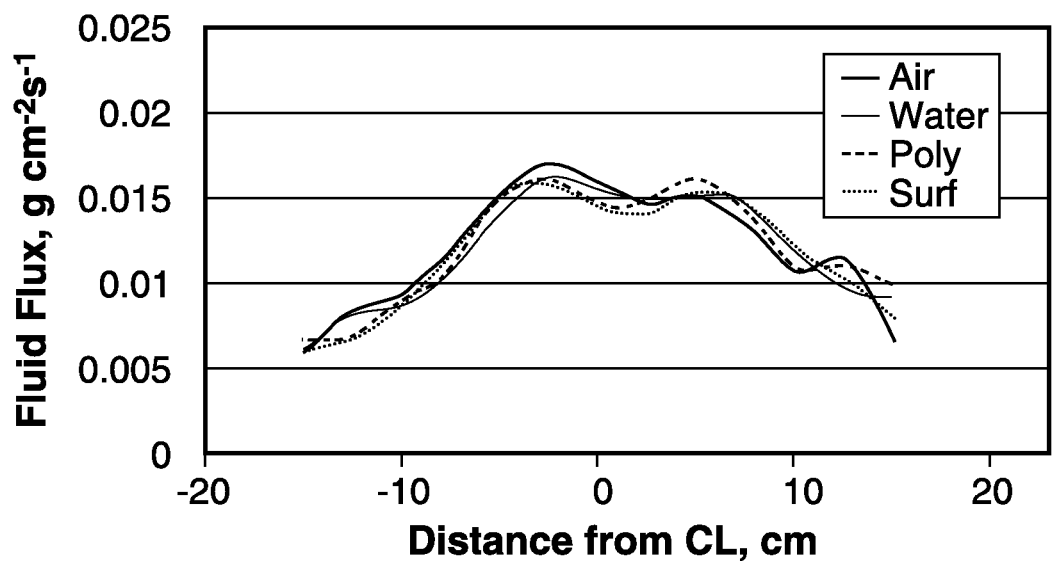
FIGS. 5A, B are graphs of the spatial distribution of spray liquid flux for air and various liquids injected into the Venturi ports of an air induction nozzle.
Figure 5B:
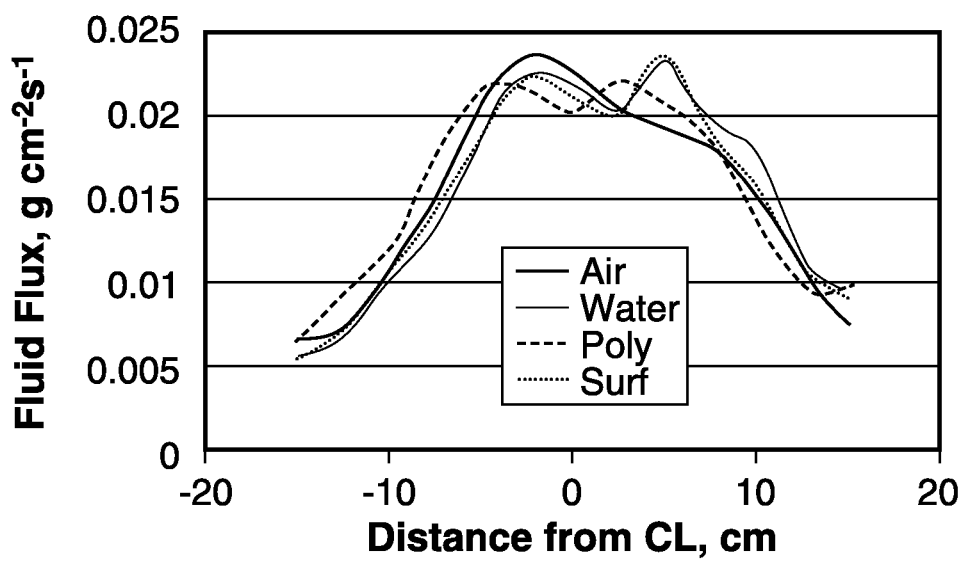

The effects of the injected fluid on the pattern or spatial distribution of spray from the nozzle was investigated. Example results are shown in FIG. 5A and FIG. 5B. The injection of various fluids did not significantly affect the distribution of the spray pattern. When compared to the typical air induction pattern, fluid injection patterns were indistinguishable from the typical.

With the mass distribution of the emitted spray unaffected by the injection of fluids into the Venturi ports of the nozzle, the distribution of the injected liquid across the spray pattern was determined. This is important in that the active ingredient of an agricultural spray application would typically be the injected material and the distribution of active ingredient must be uniform across the spray pattern. Additionally, the result provided insight into the degree of mixing provided by the relatively short transit distance and residence time of the fluid passing from the Venturi ports to the nozzle exit orifice.

Figure 6:
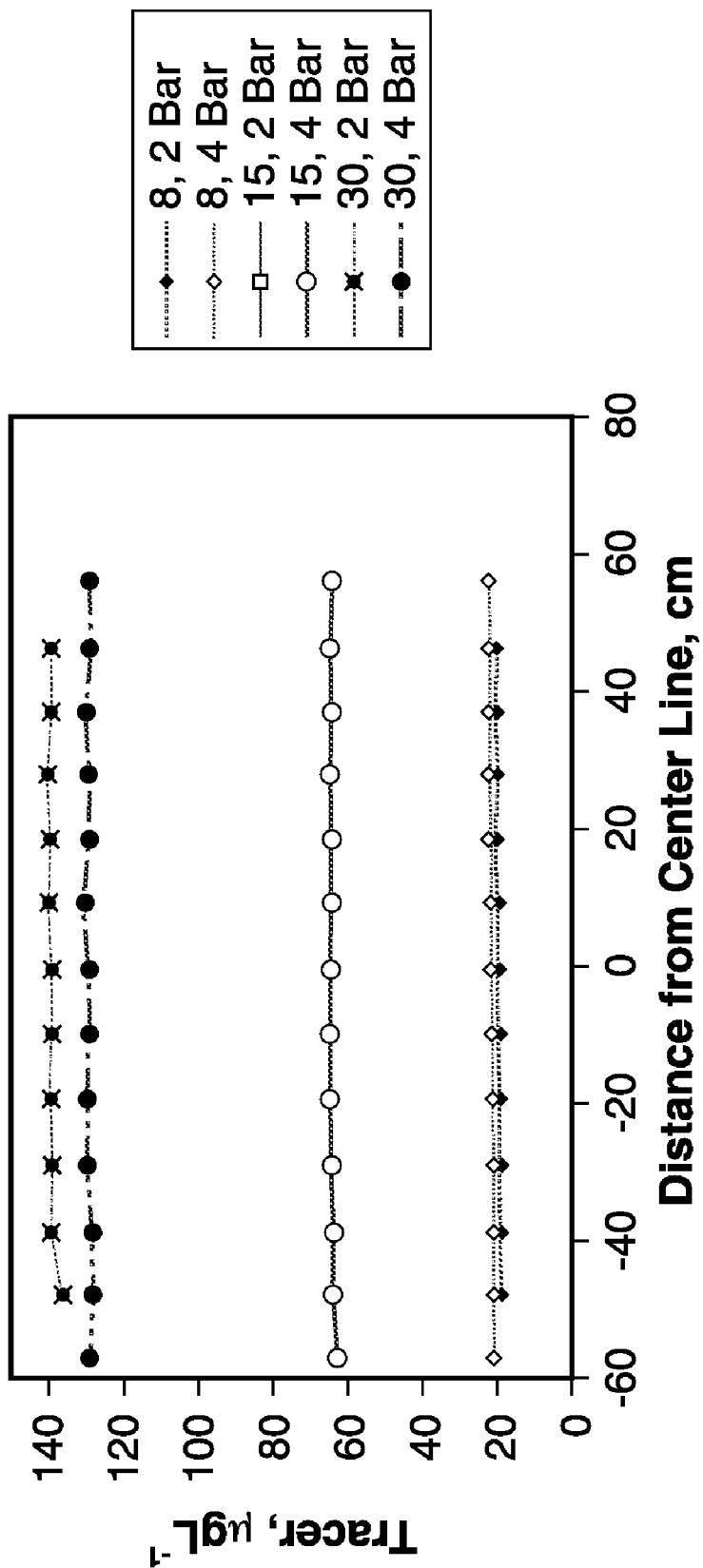
FIG. 6 is a graph of the spatial distribution of injected liquid within the spray liquid discharged from an air induction nozzle operating at different carrier liquid pressures and with varying sized injection metering plates.
Figure 7:
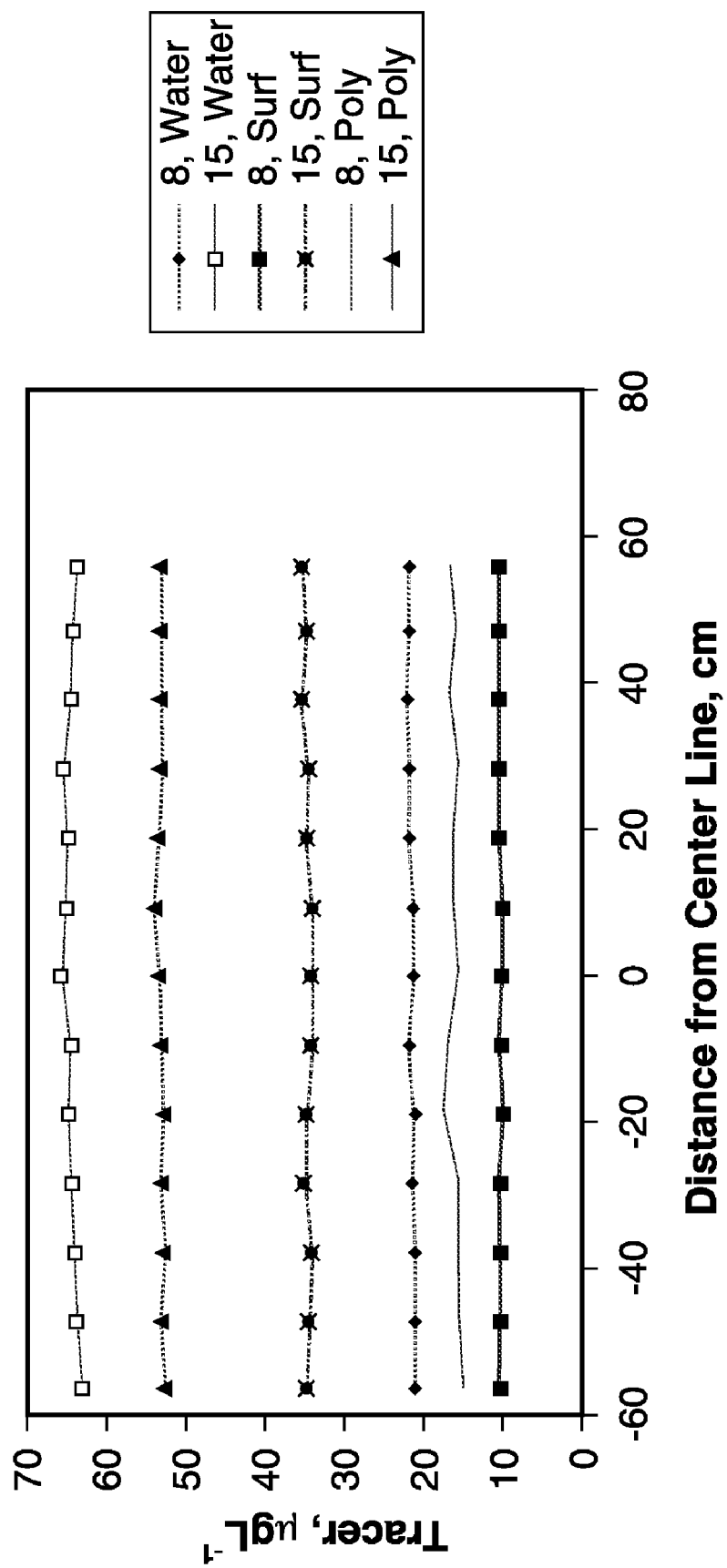
FIG. 7 is a graph of the spatial distribution of injected liquid within the spray liquid discharged from an air induction nozzle operating at 4 bar carrier liquid pressure and with varying sized injection metering plates and varying fluid properties.

Results are shown in FIG. 6 and FIG. 7. Results for water injection liquid and a range of metering plate diameters and carrier liquid supply pressures are shown in FIG. 6. The results indicate that the injected liquid is uniformly mixed within the carrier fluid and discharged uniformly across the spray pattern. In FIG. 7, the results shown focus on the lower concentration injections rates (Metering plate Nos. 8 and 15) and for the three injection liquids of water, surfactant solution and polymer solution. The observed uniformity is high and illustrates the validity of the design.

The effect of fluid injection on the droplet size spectra produced by the nozzle when the air induction ports were used as liquid inlet ports was determined. It was anticipated that the modification to the nozzle operation by replacing the induced air with injected fluid would result in a change in droplet size spectra. This was based on recognition that the purpose of the Venturi-driven air induction was to alter the atomization characteristics, and the resulting droplet size spectrum, of the spray from the nozzle. Moreover, it was further expected that the addition of fluid to the nozzle air inlets would most likely decrease the overall droplet size spectra.

Figure 8:
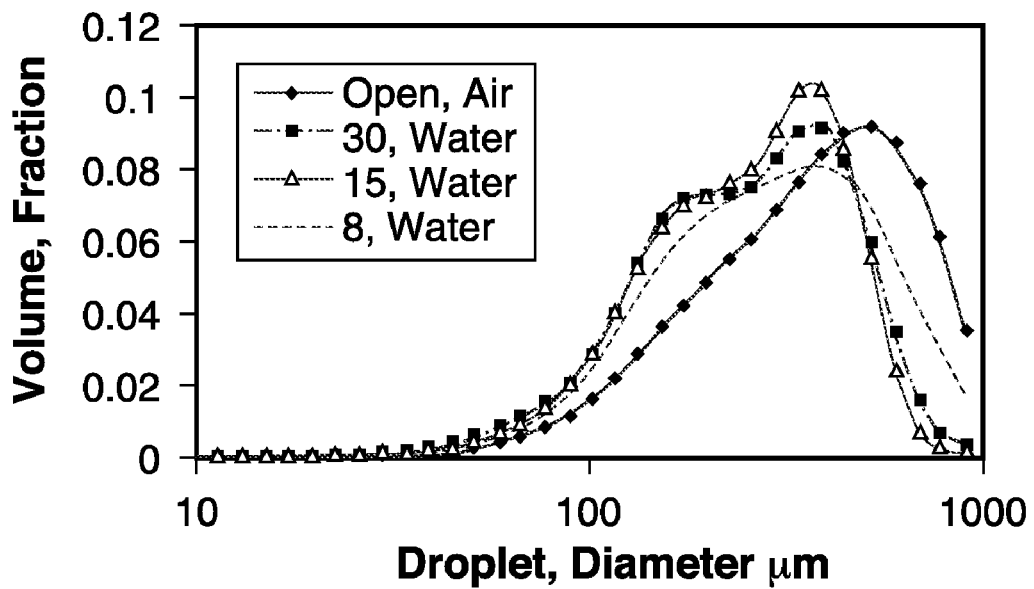
FIG. 8 is a graph of the droplet size spectra for spray droplets produced by an air induction nozzle operating at 4 bar carrier liquid pressure and with water injected into the Venturi ports with varying sized orifice metering plates in the injecting supply line.
Figure 9:
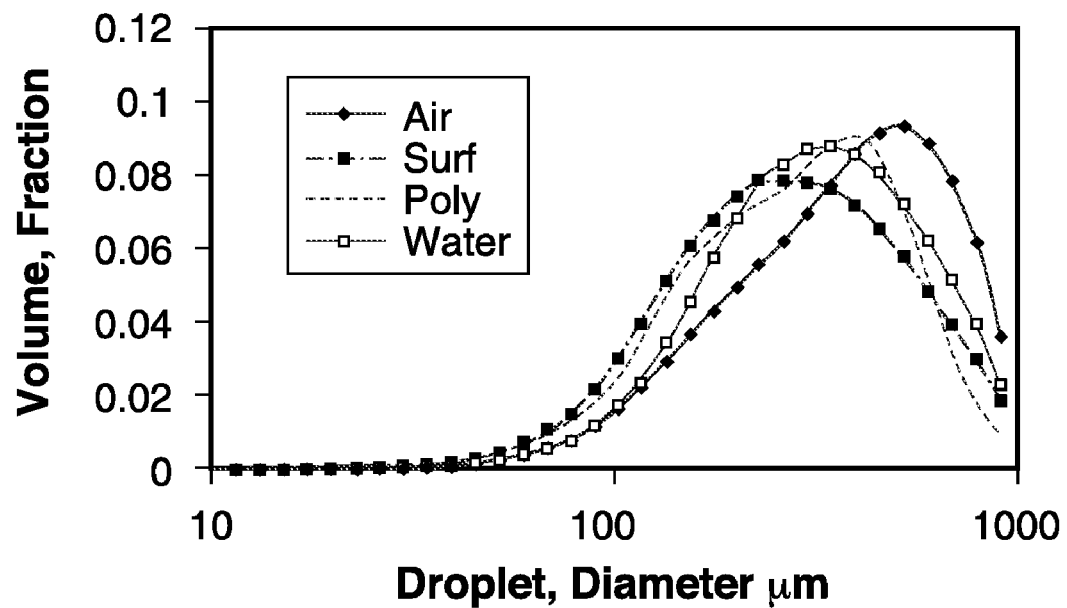
FIG. 9 is a graph of the droplet size spectra for spray droplets produced by an air induction nozzle operating at 4 bar carrier liquid pressure and with various liquids injected into the Venturi ports with a 0.008 inch diameter orifice metering plate in the injecting supply line.

Results from the experiments are shown in FIG. 8 and FIG. 9. In FIG. 8, the effects of injecting water into the Venturi ports on the resulting droplet size are realized as both an overall decrease in the droplet size spectra and a change in the shape of the spectra. For example, compared to the air induction with an average v.m.d. of 405 μm, the water injection with metering plates Nos. 8, 15 and 30 produced average v.m.d. values of 298, 269 and 266 μm, respectively.

In FIG. 9, the effects of injected fluid on the resulting droplet size spectra are illustrated. For the smallest metering plate (i.e., No. 8), the droplet size spectra for air, water, surfactant solution and polymer solution are shown. An observable effect of fluid type on droplet size spectra is noted and the general trend of decreasing droplet size with surfactant solution and increased size with polymer is seen. Air injection produces the largest size spectra.

The results observed and presented in this example established that: the Venturi air inlets of an air induction spray nozzle produce sufficient vacuum to provide the necessary power to pump useful rates of common liquids into the spray nozzle carrier fluids; the rate of liquid injection can be established and maintained at commercially useful concentrations of approximately 3 to 18% through the use of metering restrictor plates with diameters in the 0.2 to 0.7 mm range and that flow rates of injected fluid are affected by fluid properties; injection of common spray liquids, containing surfactants at the concentration of 0.25% v/v and polymers at similar concentrations does not significantly affect the spray nozzle distribution pattern; at a typical operating carrier fluid supply pressure of 2 to 4 bar, injection of fluids into the Venturi ports results in a uniform mixing and discharge of the injected fluid across the spray pattern; and, injection of fluid, rather than air, into the Venturi air ports of an air induction nozzle significantly alters the droplet size spectra of the emitted spray; it tends to produce smaller droplets and create a more bimodal size distribution.

EXAMPLE 2

In this example an array of 6 nozzles was fabricated in a linear spray boom with 20 inches between each nozzle. A system of spray collectors was devised to capture the emitted spray on a plane 20 inches below the exit tips of the spray nozzles. The spray discharge was collected in 1.5 inch increments along the plane. This provided a measure of the uniformity of the spray mix along the entire 120 inch spray pattern created by the 6-nozzle spray boom. Salt tracer was added to the injected fluid as discussed in Example 1. The measurement techniques used in Example 1 were also used for this example.

The system was fabricated as illustrated in FIG. 1. The nozzles were AI 11008 nozzles (Spraying Systems, Inc.) and operated at a carrier liquid pressure of 2 bar. In the first set of tests, the nozzles were configured similarly as shown in FIG. 2 with an injection line directed to each side of the Venturi inlet. The test orifices were Nos. 10, 20 and 41 as described in Example 1.

Figure 10:
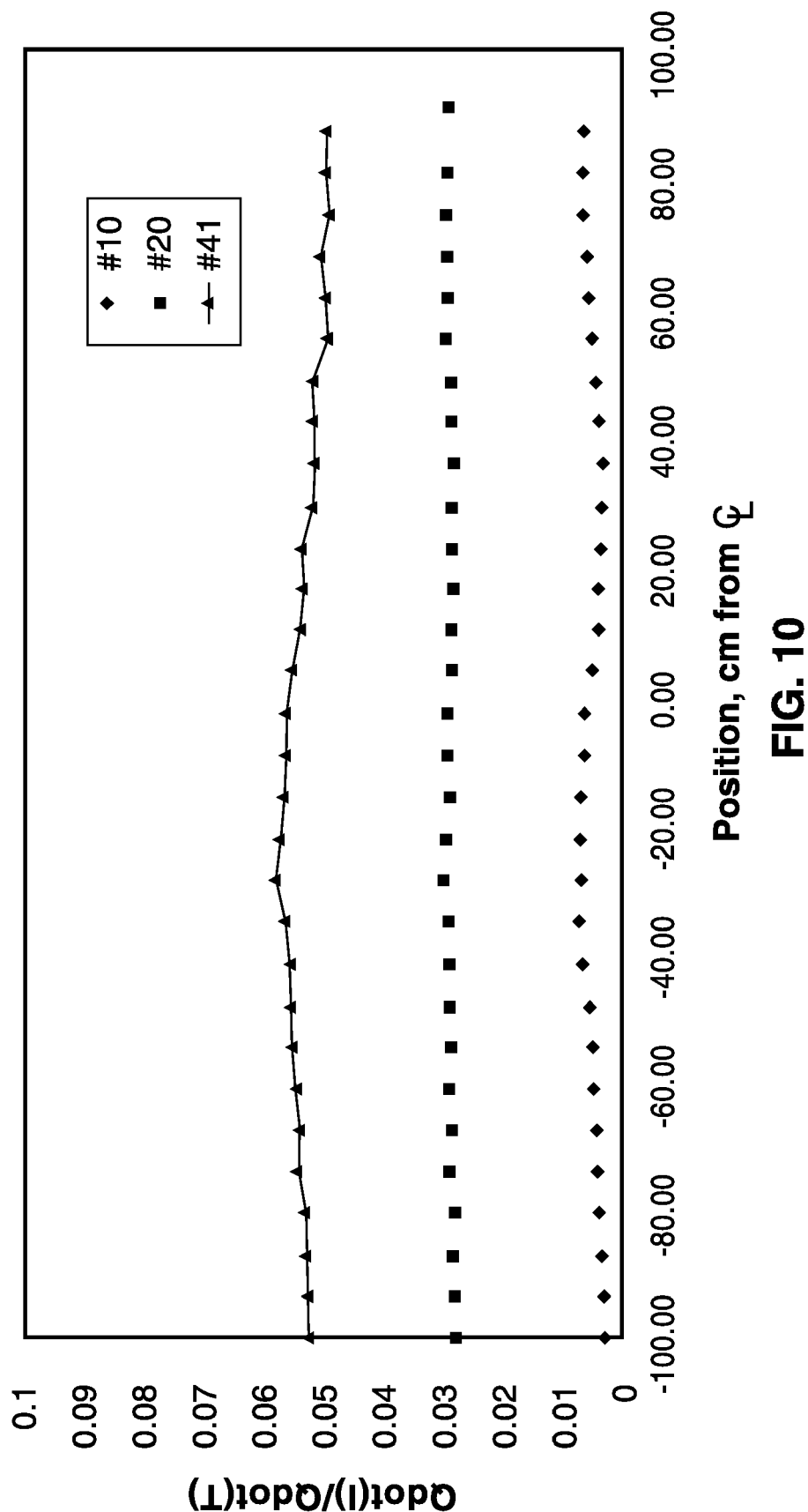
FIG. 10 is a graph of the spatial distribution of injected liquid within the spray liquid discharged from an array of 6 AI 11008 air induction nozzles operating at 2 bar carrier liquid pressure, with varying sized injection metering plates and with injection fluid injected into 2 inlets into the Venturi.

The resulting measurements of injected liquid concentration across a 2 m section of the central spray pattern are shown in FIG. 10. The results show the uniformity of the pattern and the effect of changing the metering plate diameter.

In a subsequent test, the injection flow system was altered to use only one injection port on each nozzle. The remaining port was blocked off to liquid or air inlet. This test was to determine the feasibility of a more simple design in which each nozzle would be supplied with 1, rather than 2, inlet injection liquid inlet lines and orifice metering plates.

Figure 11:
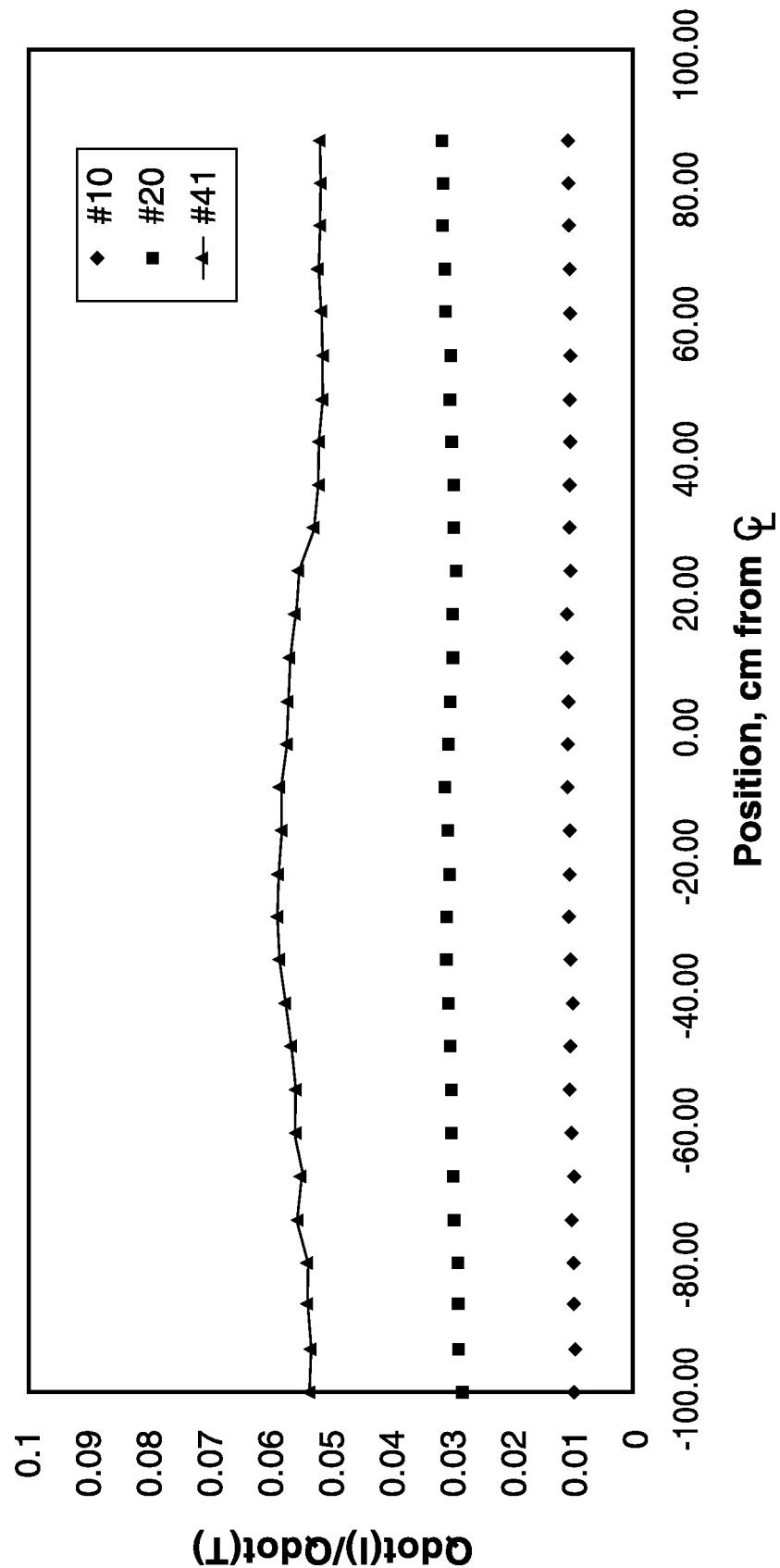
FIG. 11 is a graph of the spatial distribution of injected liquid within the spray liquid discharged from an array of 6 AI 11008 air induction nozzles operating at 2 bar carrier liquid pressure, with varying sized injection metering plates and with injection fluid injected into a single inlet into the Venturi.
Figure 12:
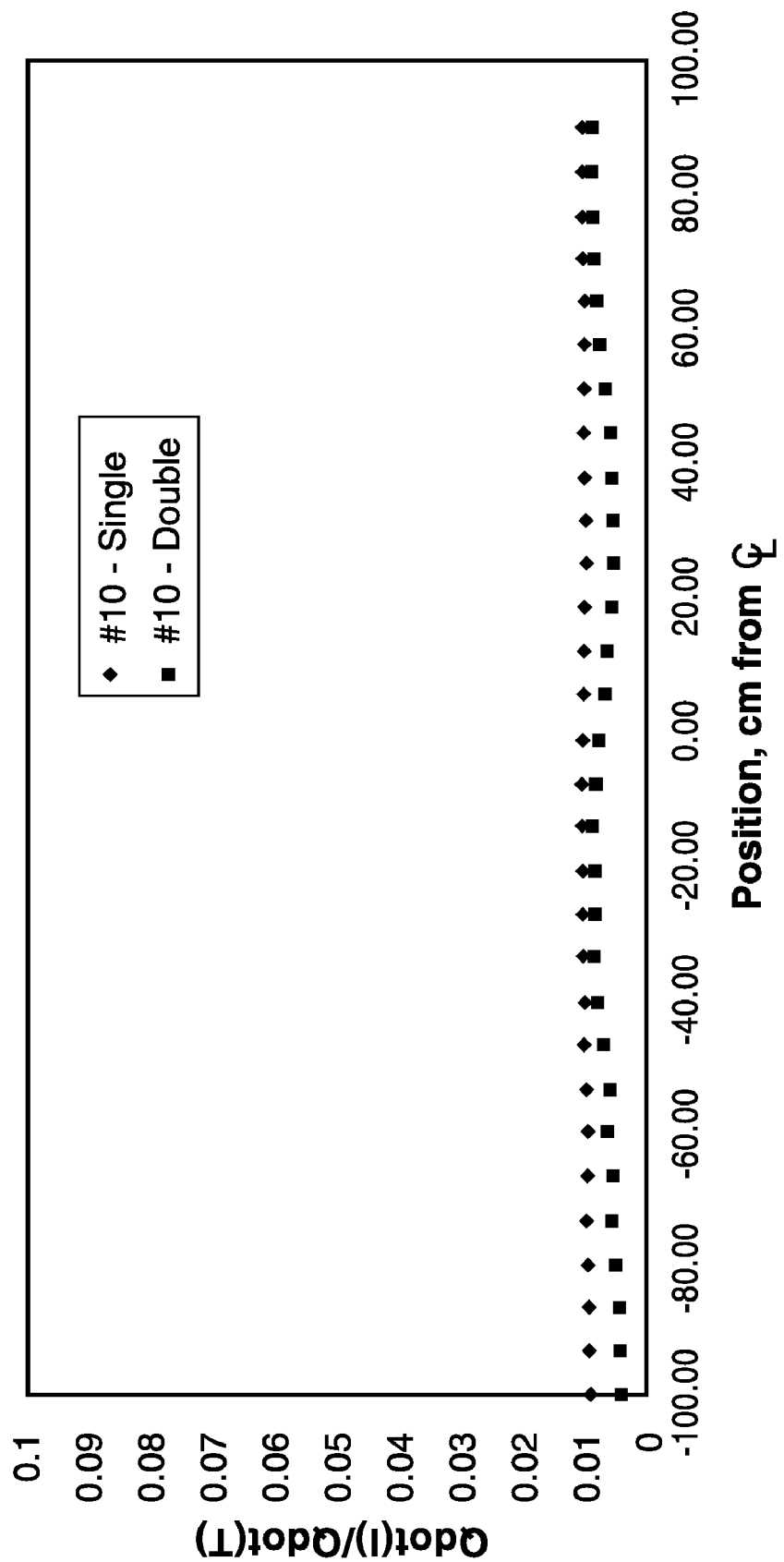
FIG. 12 is a graph of the spatial distribution of injected liquid within the spray liquid discharged from an array of 6 AI 11008 air induction nozzles operating at 2 bar carrier liquid pressure, with a 0.010 inch diameter injection metering plate and with injection fluid injected into a single inlet versus 2 inlets into the Venturi.
Figure 13:
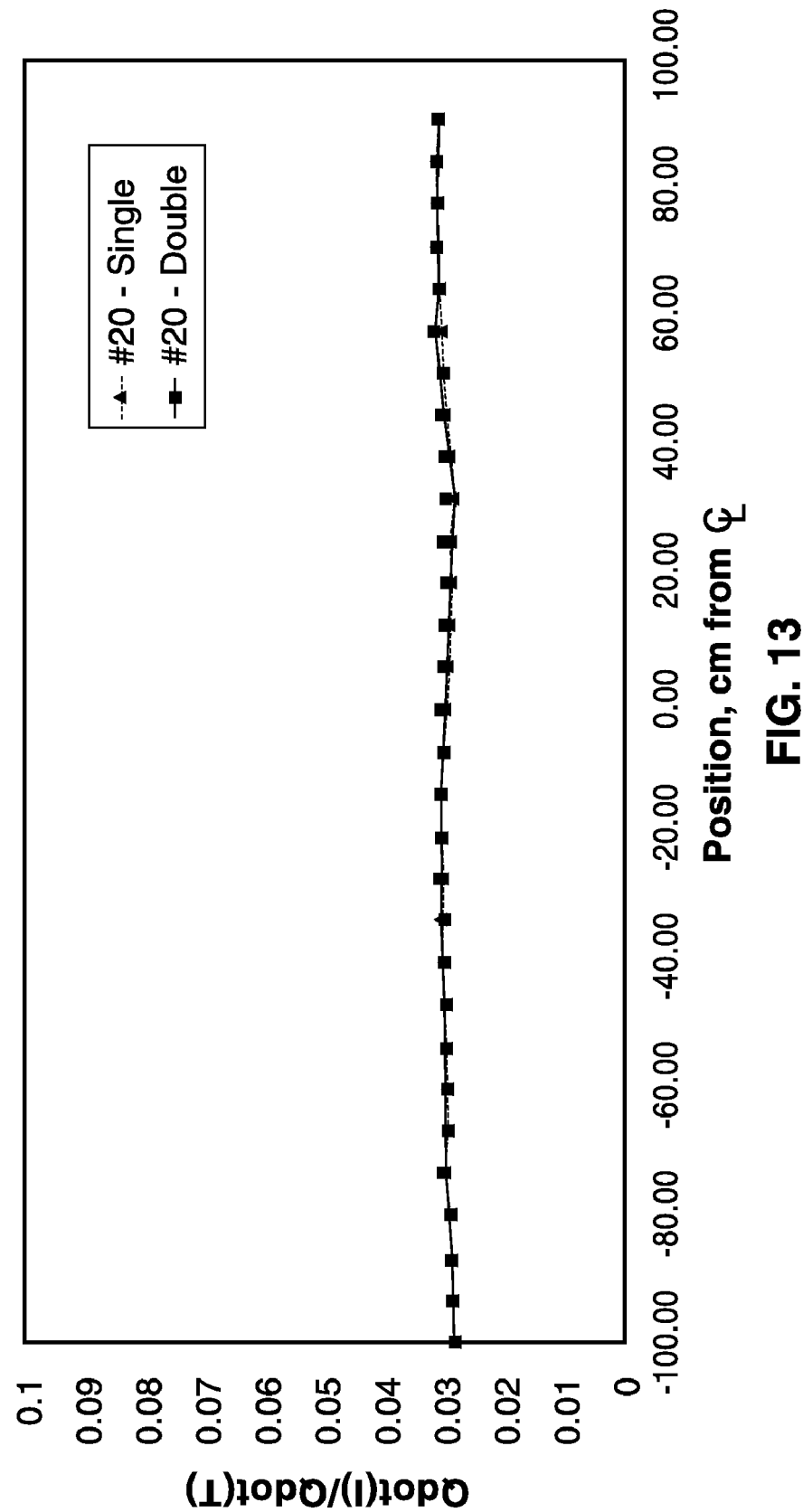
FIG. 13 is a graph of the spatial distribution of injected liquid within the spray liquid discharged from an array of 6 AI 11008 air induction nozzles operating at 2 bar carrier liquid pressure, with a 0.020 inch diameter injection metering plate and with injection fluid injected into a single inlet versus 2 inlets into the Venturi.
Figure 14:
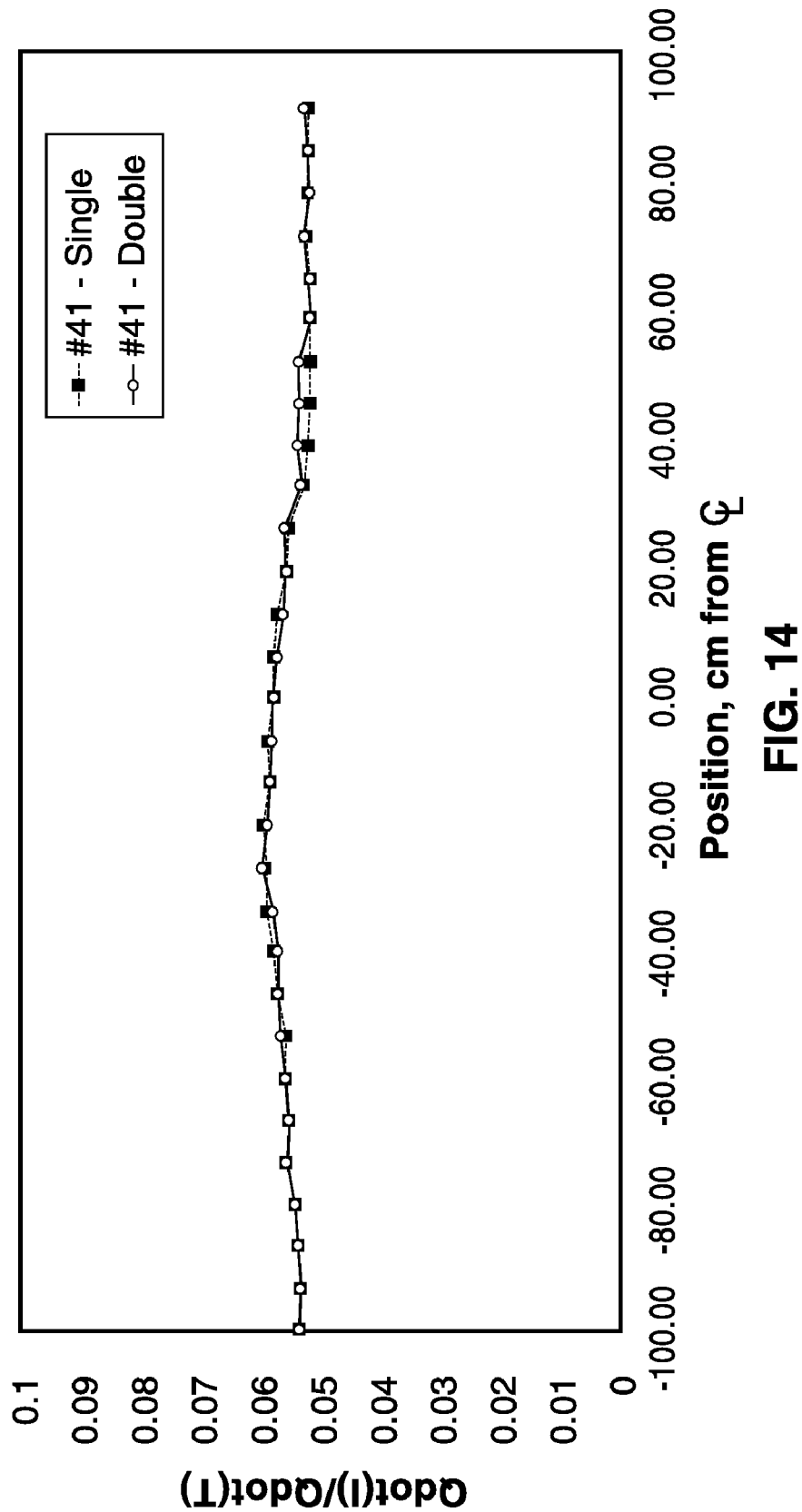
FIG. 14 is a graph of the spatial distribution of injected liquid within the spray liquid discharged from an array of 6 AI 11008 air induction nozzles operating at 2 bar carrier liquid pressure, with a 0.041 inch diameter injection metering plate and with injection fluid injected into a single inlet versus 2 inlets into the Venturi.

The results of the "single port" experiment are shown in FIG. 11 and reveal that uniformity of distribution of injected liquid was maintained. FIG. 12, FIG. 13 and FIG. 14 show comparisons of single versus double port injection and establish that single port injection is suitable for practice of the invention.

EXAMPLE 3

It is desirable to have an active control over the flow rate of the injected liquid into the Venturi passage in the nozzle. This would provide a means for adjusting the application rate of active ingredient contained in the injected liquid. In this example, the system shown in FIG. 1 was tested. A controllable needle metering valve was used to alter the injection rate of liquid into the nozzles. A No. 41 metering orifice plate was installed as orifice plate assembly.

In the first test, 6 AI 11008 nozzles were operated as described in Example 2. Spray tracer fluid was used as in Example 2. However, rather than manually changing the orifice plates to adjust injection flow rate, the needle valve was manually closed until the flow rate on flowmeter was observed to match that obtained then orifice plates 10 and 20 were installed at location.

Figure 15:
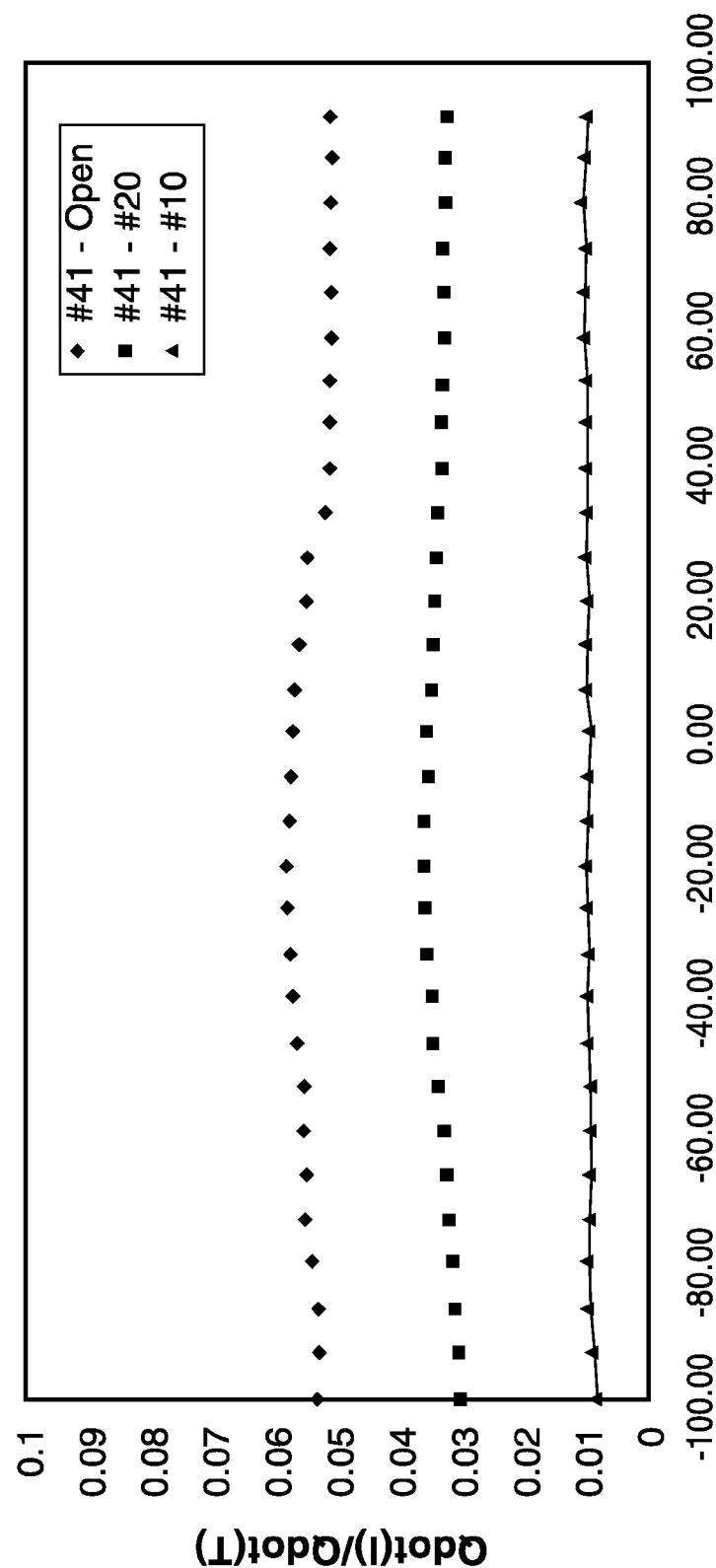
FIG. 15 is a graph of the spatial distribution of injected liquid within the spray liquid discharged from an array of 6 AI 11008 air induction nozzles operating at 2 bar carrier liquid pressure, with a 0.041 inch diameter injection metering plate and with injection fluid injected into a single inlet into the Venturi and with the injection fluid metered using a throttling needle valve to simulate smaller diameter metering orifice plates.
Figure 16:
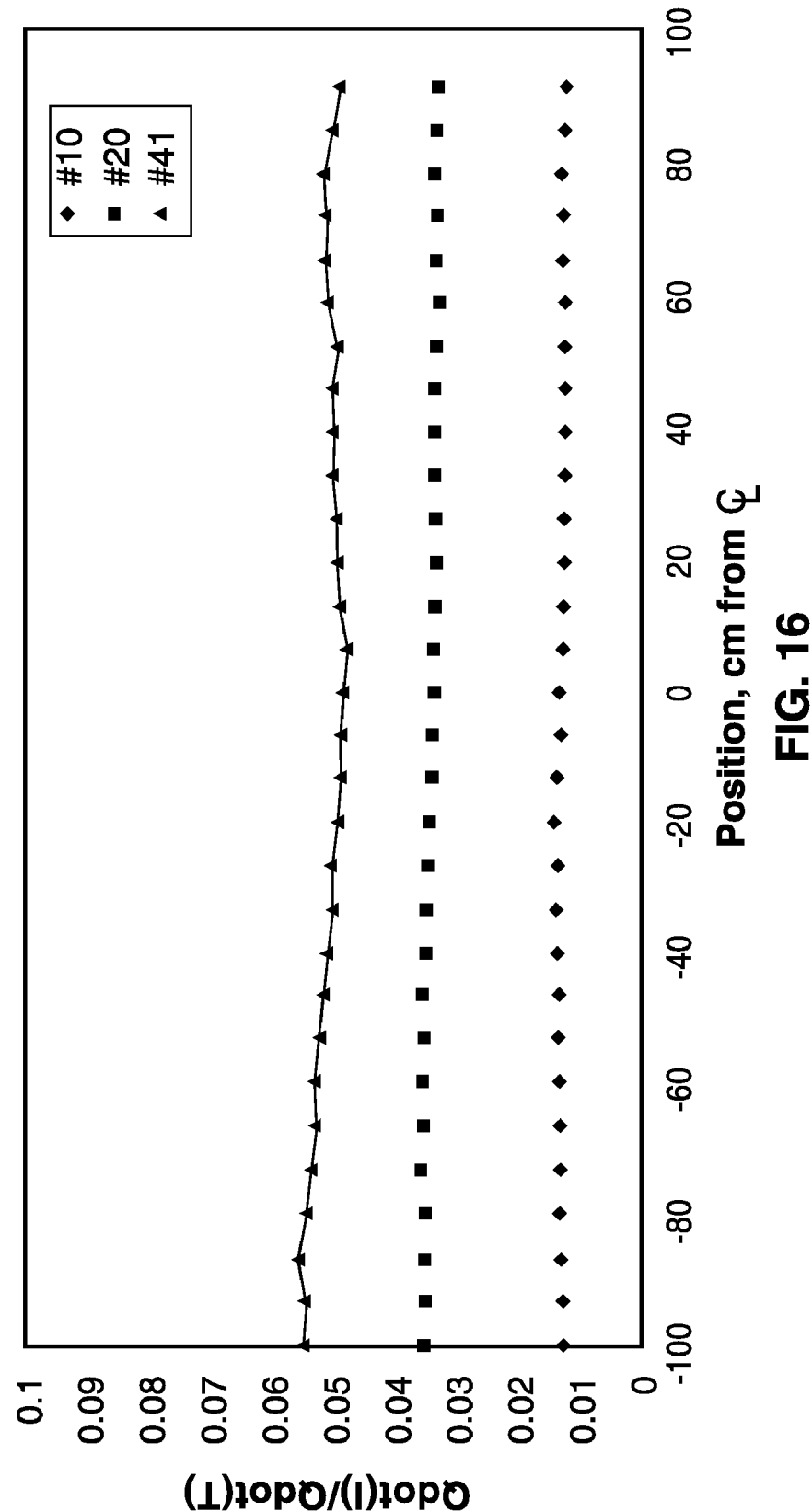
FIG. 16 is a graph of the spatial distribution of injected liquid within the spray liquid discharged from an array of 6 AI 11006 air induction nozzles operating at 2 bar carrier liquid pressure, with 0.010, 0.020 and 0.041 inch diameter injection metering plates and with injection fluid injected into a single inlet into the Venturi.
Figure 17:
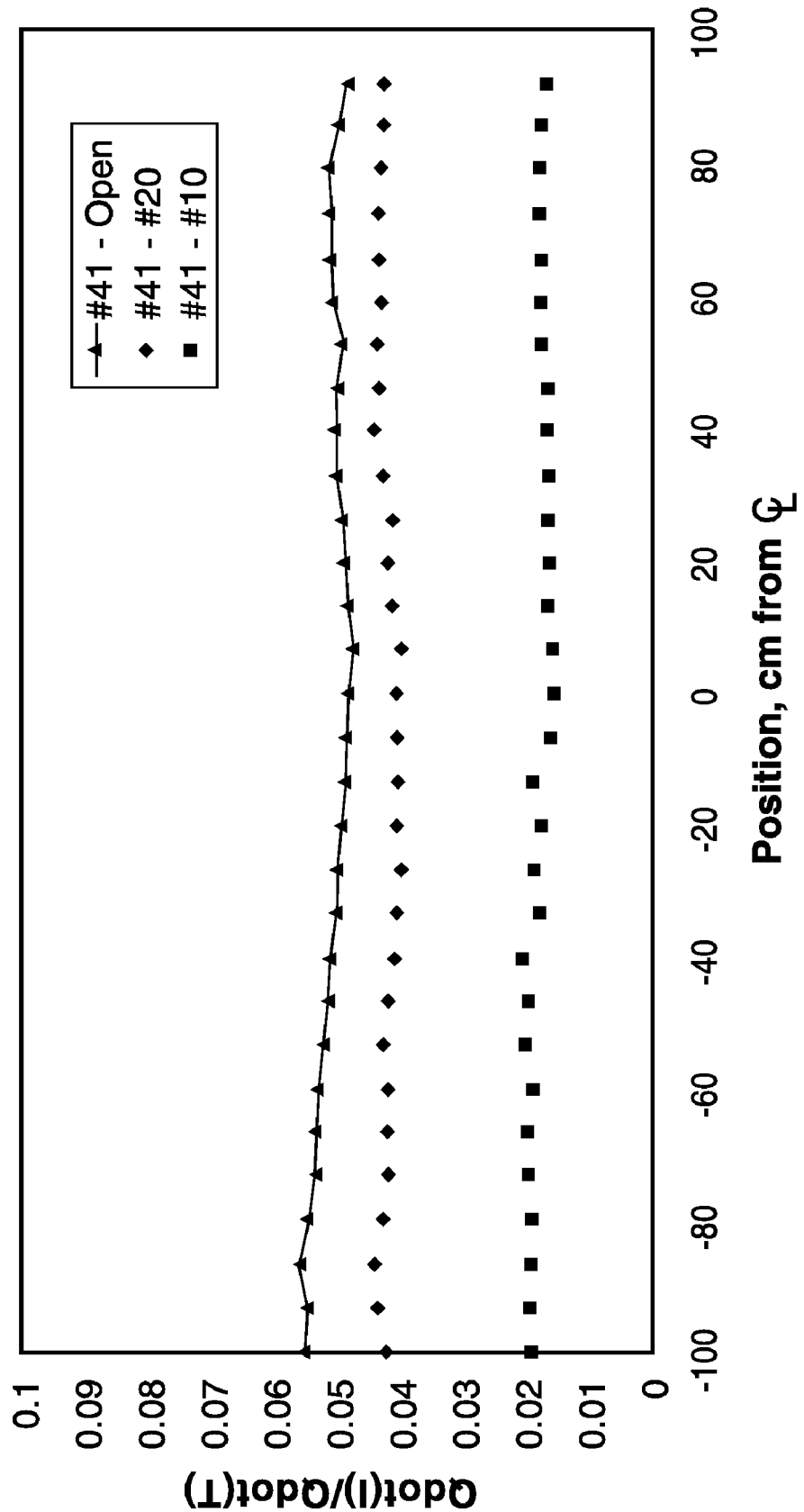
FIG. 17 is a graph of the spatial distribution of injected liquid within the spray liquid discharged from an array of 6 AI 11006 air induction nozzles operating at 2 bar carrier liquid pressure, with a 0.041 inch diameter injection metering plate and with injection fluid injected into a single inlet into the Venturi and with the injection fluid metered using a throttling needle valve to simulate smaller diameter metering orifice plates.
Figure 18:
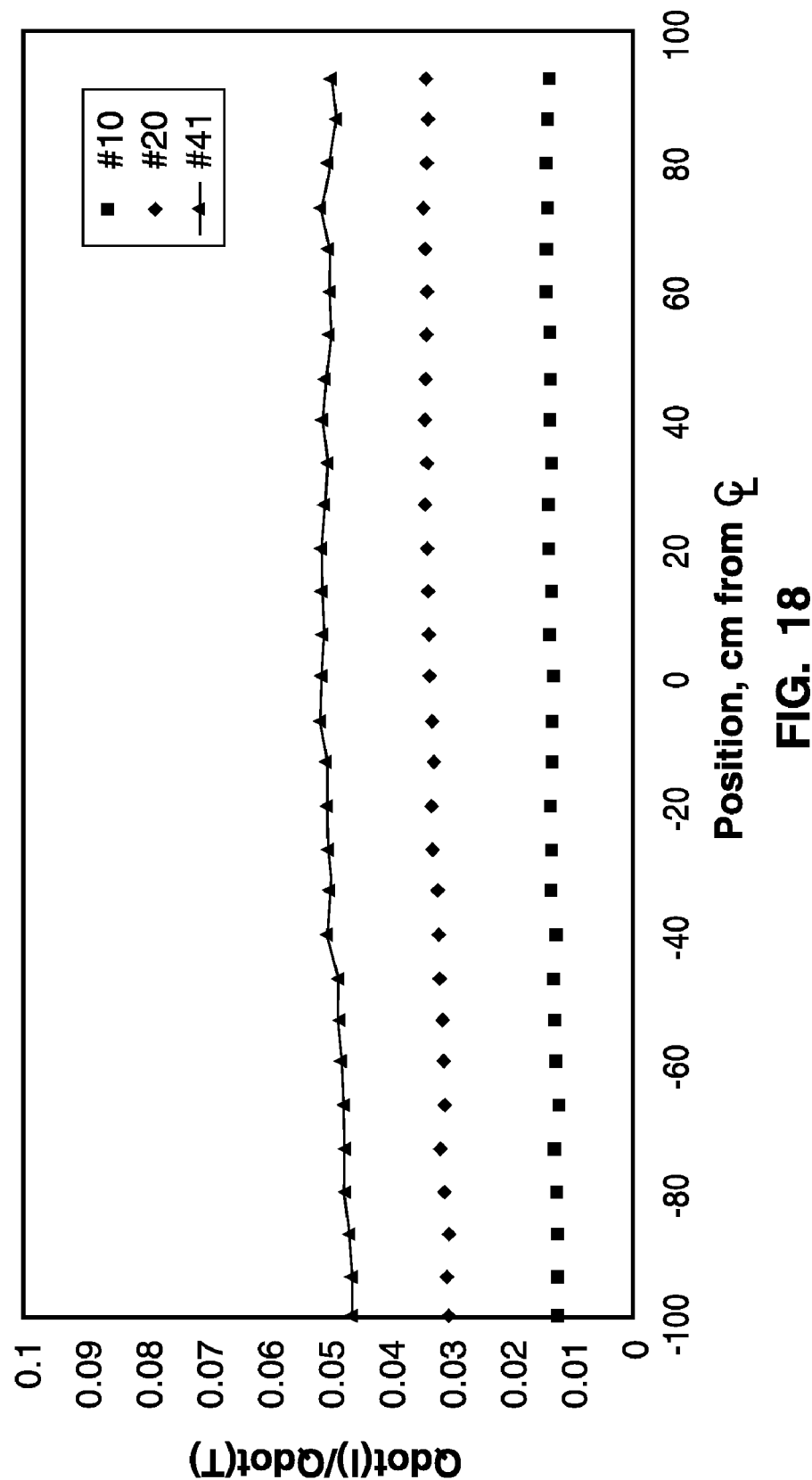
FIG. 18 is a graph of the spatial distribution of injected liquid within the spray liquid discharged from an array of 6 AI 11004 air induction nozzles operating at 2 bar carrier liquid pressure, with 0.010, 0.020 and 0.041 inch diameter injection metering plates and with injection fluid injected into a single inlet into the Venturi.
Figure 19:
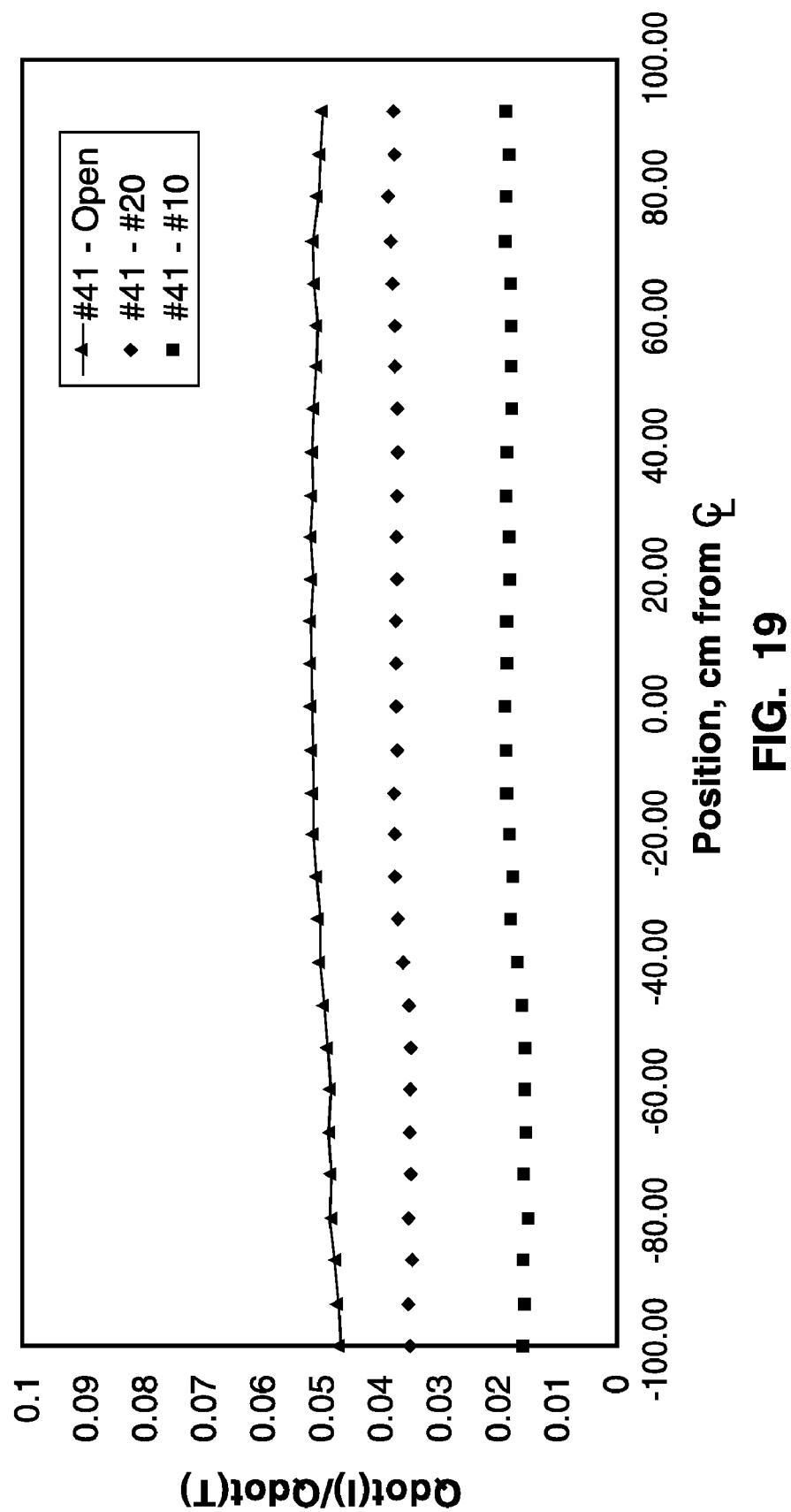
FIG. 19 is a graph of the spatial distribution of injected liquid within the spray liquid discharged from an array of 6 AI 11004 air induction nozzles operating at 2 bar carrier liquid pressure, with a 0.041 inch diameter injection metering plate and with injection fluid injected into a single inlet into the Venturi and with the injection fluid metered using a throttling needle valve to simulate smaller diameter metering orifice plates.
Figure 20:
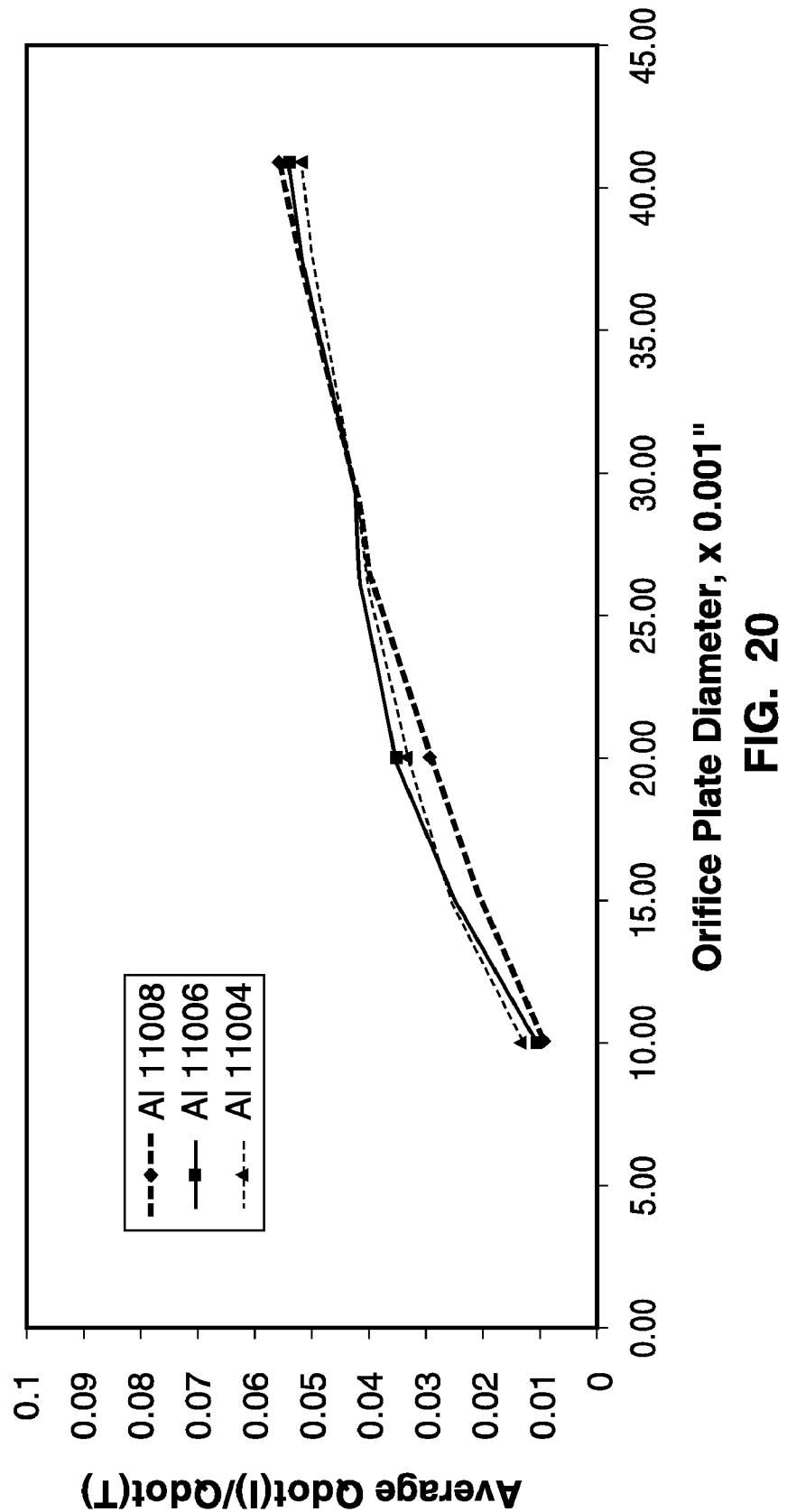
FIG. 20 is a graph of the concentration of injected fluid in the discharged spray liquid from a range of nozzles operating at 2 bar and with a range of injection metering plate diameters.

The results are shown in FIG. 15. Injection rates and resulting spray concentrations equivalent to those achieved by replacing the metering plates were achieved and spray uniformity was maintained.

The test described above was repeated after the nozzles had been changed from AI 11008 nozzles to AI 11006 nozzles. The AI 11006 nozzles have approximately 25% less flow capacity than the AI 11008 nozzles.

The results of the AI 11006 nozzle tests are shown in FIG. 16 and FIG. 17. The results show similar trends to those from the AI 11008 nozzle tests. The metering valve can be used to control the spray concentration and uniformity is maintained.

The test described above was repeated after the nozzles had been changed from AI 11008 nozzles to AI 11004 nozzles. The AI 11004 nozzles have approximately 50% less flow capacity than the AI 11008 nozzles.

The results of the AI 11004 nozzle tests are shown in FIG. 18 and FIG. 19. The results show similar trends to those from the AI 11008 and AI 11006 nozzle tests. The metering valve can be used to control the spray concentration and uniformity is maintained.

The test data from the evaluations in Example 3 were collected and re-analyzed to establish the relationship between orifice plate diameter and resulting concentration of injected fluid in the discharged spray when the nozzles were operated at 2 bar. The results are shown in FIG. 20 and illustrated how orifice diameter affects the injection flow rate.

The present invention thus provides a system and method of using embedded Venturi passageways within nozzles to propel and mix injected liquid into a carrier stream of spray liquid. Further, the passive and active flow control characteristics are established and shown as a means to improve the application of agrochemicals from mobile equipment.

The invention is particularly suited for use with agricultural and industrial sprayers, however, it will be understood that the apparatus and system can be used in any application or system that requires controlled liquid sprays.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A system for dispensing controlled amounts of an additive mixed with a carrier, comprising:

one or more dispensing and mixing nozzles, each nozzle including a Venturi and an induction port in communication with the Venturi;

a carrier fluid supply connected to each nozzle comprising a carrier fluid reservoir for holding the carrier fluid, a carrier fluid supply circuit, a first pump, a first metering and control valve, a first flow meter, a first pressure transducer, and a carrier fluid distribution manifold, arranged in series, the carrier fluid distribution manifold being connected to each nozzle; and an additive fluid supply comprising an additive fluid reservoir for holding the additive fluid and an additive fluid supply circuit having a second metering and control valve, a second flow meter, a second pressure transducer, and an additive fluid distribution manifold, arranged in series, the additive fluid distribution manifold being connected to the induction port of each nozzle;

wherein carrier fluid flow through the Venturi in the nozzle causes additive fluid to be drawn into the nozzle and mixed with the carrier fluid prior to exiting the nozzle.

2. The system of claim 1, wherein each nozzle is an air induction nozzle.

3. The system of claim 1, further comprising a control system for controlling the flow of the additive fluid, the carrier fluid, or both to each nozzle.

4. The system of claim 3, wherein the control system comprises a controller and at least one of a global positioning location and rate map device and a crop sensor in communication with the controller, the controller receiving information therefrom, and based thereon adjusting the flow rates of the carrier fluid, the additive fluid or both.

5. The system of claim 1, further comprising a control system for controlling the flow of the additive fluid, the carrier fluid, or both to each nozzle.

6. The system of claim 5, wherein the control system comprises a controller in communication with the first and second flow meters and the first and second pressure transducers for receiving information therefrom, and in communication with the first pump, and the first and second metering and control valves for controlling the flow of the carrier fluid, the additive fluid, or both in response thereto.

7. The system of claim 1, wherein the additive fluid supply circuit further comprises a metering orifice for controlling additive fluid flow to the induction port of each nozzle.

8. The system of claim 1, wherein the carrier fluid supply circuit comprises a pump and a flow control device for feeding controlled amounts of the carrier fluid to each nozzle.

9. The system of claim 1, wherein the carrier fluid supply and additive fluid supply each comprise a liquid supply or gas supply or combinations thereof.

10. The system of claim 1, wherein the additive fluid supply is a supply of an agrochemical.

* * * * *